United States Patent
Ori et al.

(10) Patent No.: US 10,095,009 B2
(45) Date of Patent: Oct. 9, 2018

(54) ZOOM LENS AND IMAGING APPARATUS

(71) Applicant: FUJIFILM Corporation, Tokyo (JP)

(72) Inventors: Tetsuya Ori, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 409 days.

(21) Appl. No.: 14/857,844

(22) Filed: Sep. 18, 2015

(65) Prior Publication Data
US 2016/0018630 A1    Jan. 21, 2016

Related U.S. Application Data

(63) Continuation of application No. PCT/JP2013/007607, filed on Dec. 26, 2013.

(30) Foreign Application Priority Data

Mar. 27, 2013  (JP) .................... 2013/065916
Sep. 24, 2013  (JP) .................... 2013-196515

(51) Int. Cl.
*G02B 15/163* (2006.01)
*G02B 27/64* (2006.01)
(Continued)

(52) U.S. Cl.
CPC ......... *G02B 15/163* (2013.01); *G02B 15/173* (2013.01); *G02B 15/20* (2013.01); *G02B 27/646* (2013.01)

(58) Field of Classification Search
CPC .......... G02B 15/14; G02B 15/00; G02B 9/62; G02B 15/163; G02B 15/173; G02B 15/20; G02B 27/646

(Continued)

(56) References Cited

U.S. PATENT DOCUMENTS 4,830,477 A * 5/1989 Takahashi ............ G02B 15/173
                                                        359/683
5,189,557 A   2/1993 Endo
(Continued)

FOREIGN PATENT DOCUMENTS

JP      H10133113 A  *  5/1998
JP      H1172705 A   *  3/1999
(Continued)

OTHER PUBLICATIONS

Translation of Hayakawa, JPH10133113A, May 1998.*
(Continued)

*Primary Examiner* — Jordan Schwartz
*Assistant Examiner* — George G King
(74) *Attorney, Agent, or Firm* — Young & Thompson

(57) ABSTRACT

A zoom lens is constituted essentially by six lens groups, in order from the object side to the image side: a first lens group having a positive refractive power; a second lens group having a negative refractive power; a third lens group having a positive refractive power; a fourth lens group having a positive refractive power; a fifth lens group having a negative refractive power; and a sixth lens group having a positive refractive power. The distances between all pairs of adjacent lens groups change when changing magnification from the wide angle end to the telephoto end, and Conditional Formula (1) below is satisfied:

$$-5 < f1/f2 < -1.5 \quad (1)$$

wherein f1 is the focal length of the first lens group, and f2 is the focal length of the second lens group.

18 Claims, 14 Drawing Sheets

(51) Int. Cl.
*G02B 15/20* (2006.01)
*G02B 15/173* (2006.01)

(58) Field of Classification Search
USPC .................. 359/745, 750–752, 756, 758
See application file for complete search history.

(56) References Cited

U.S. PATENT DOCUMENTS

| | | | | |
|---|---|---|---|---|
| 6,061,180 | A | * | 5/2000 | Hayakawa ............ G02B 15/173 359/557 |
| 2005/0275949 | A1 | | 12/2005 | Fujimoto et al. |
| 2006/0203356 | A1 | | 9/2006 | Fujimoto et al. |
| 2012/0026602 | A1 | | 2/2012 | Uchida et al. |
| 2013/0038946 | A1 | | 2/2013 | Morooka |

FOREIGN PATENT DOCUMENTS

| | | |
|---|---|---|
| JP | 11-202201 | 7/1999 |
| JP | 2001075008 A * | 3/2001 |
| JP | 2005-195757 | 7/2005 |
| JP | 2005-352057 | 12/2005 |
| JP | 2008-225314 | 9/2008 |
| JP | 2009-217167 | 9/2009 |
| JP | 2011-209347 | 10/2011 |
| JP | 2012-053444 | 3/2012 |
| JP | 2013-037326 | 2/2013 |
| JP | 2013-097324 | 5/2013 |

OTHER PUBLICATIONS

Translation of, Fukuda, et al, JPH1172705A, Mar. 1999.*
Translation of, Fukuda, JP2001075008A, Mar. 2001.*
German Office Action dated Jun. 8, 2017; Patent Application No. 11 2013 006 887.7.
Chinese Official Action—201380074882X—Jan. 3, 2017.
International Search Report PCT/JP2013/007607 dated Mar. 18, 2014.
International Search Opinion PCT/ISA/237 with a partial English translation dated Mar. 18, 2014.

* cited by examiner

FIG.1
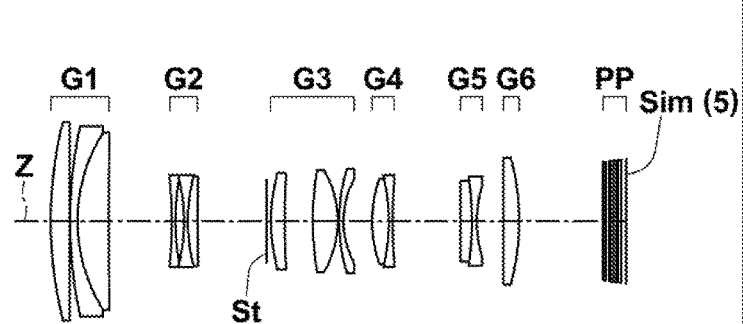
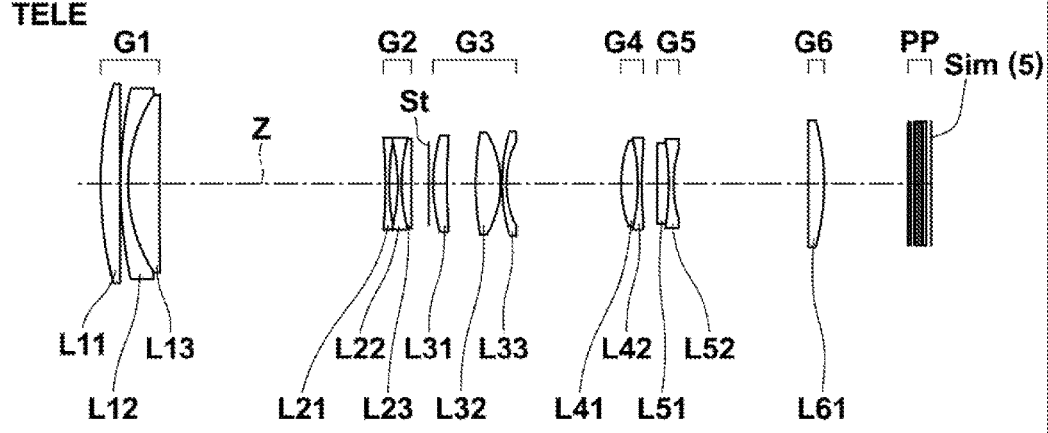

FIG.2
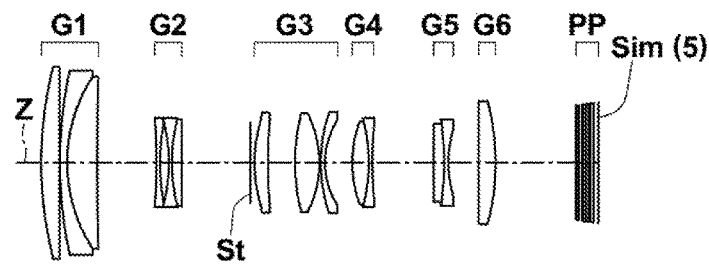
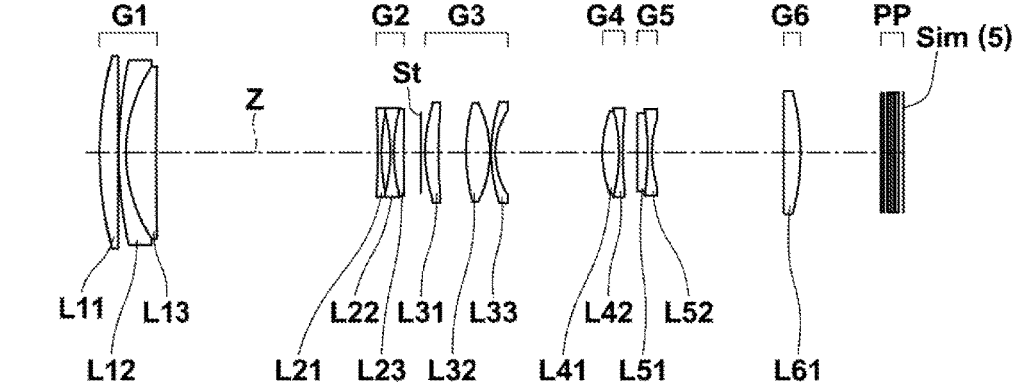

FIG.3
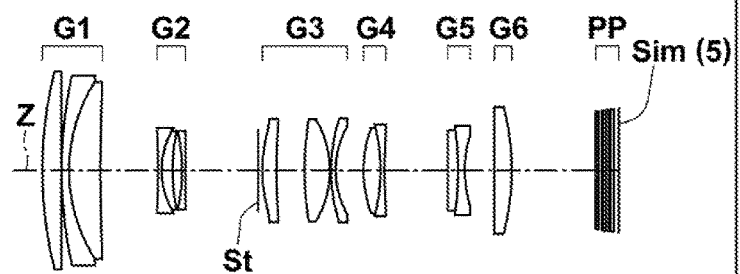
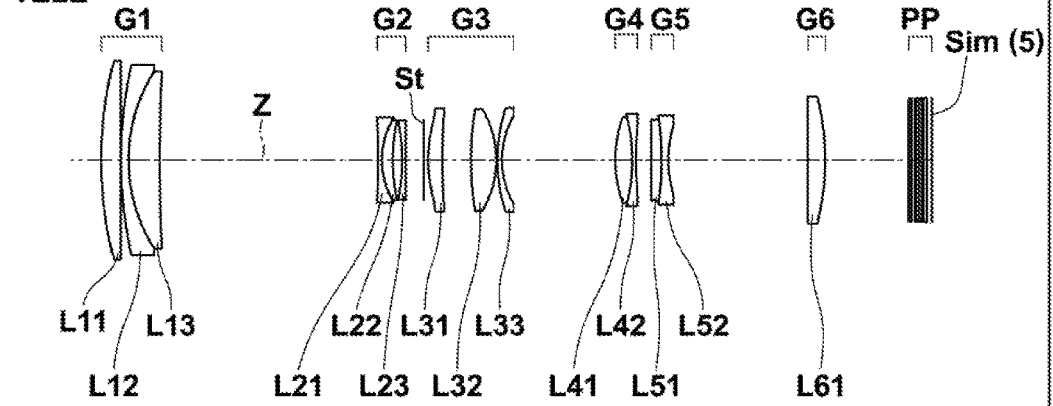

FIG.4
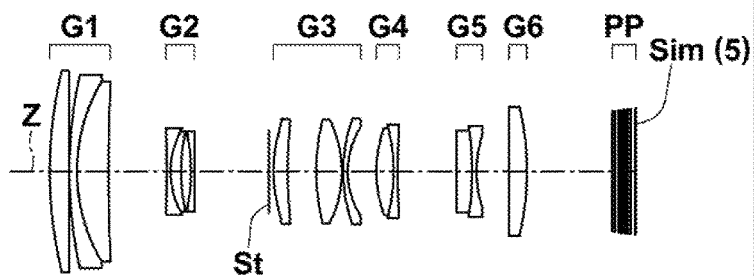
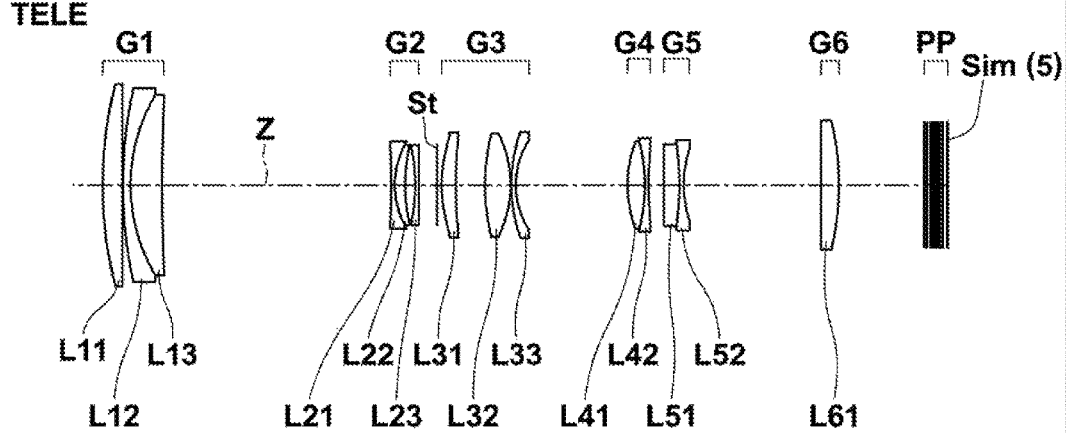

FIG.5
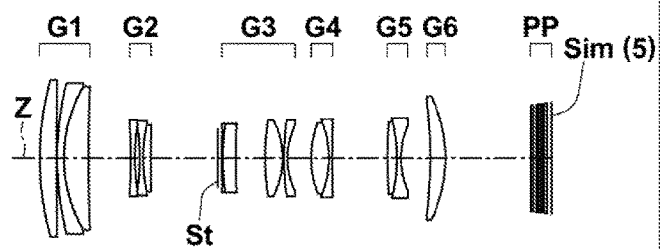
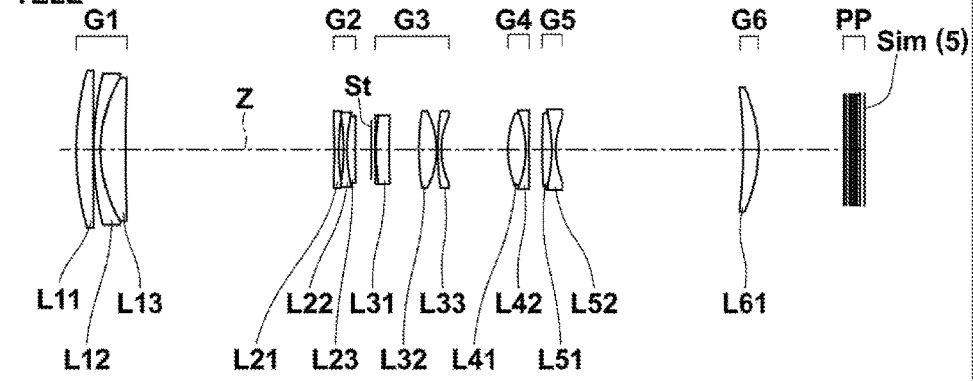

FIG.6
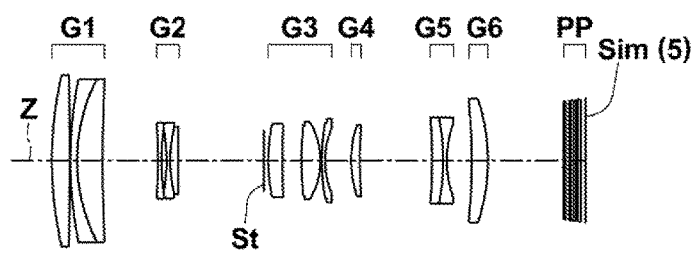
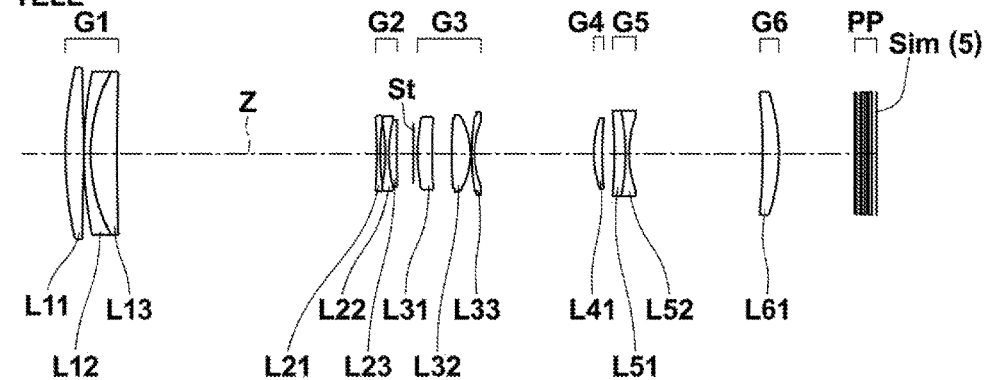

FIG.7
WIDE
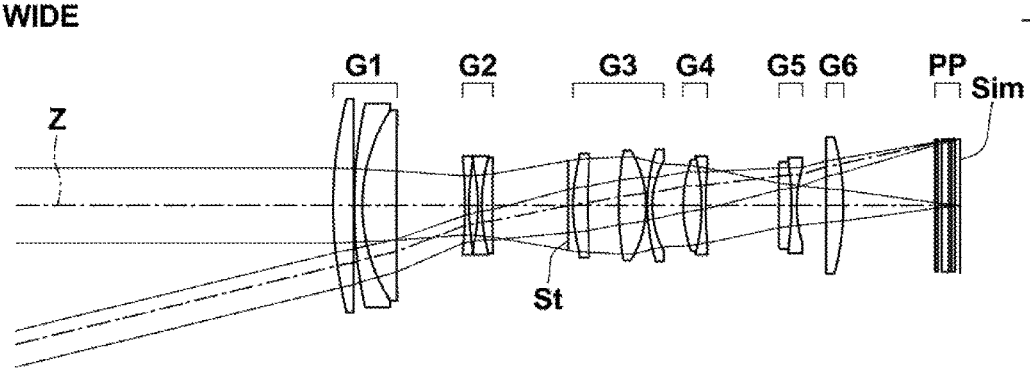
MIDDLE
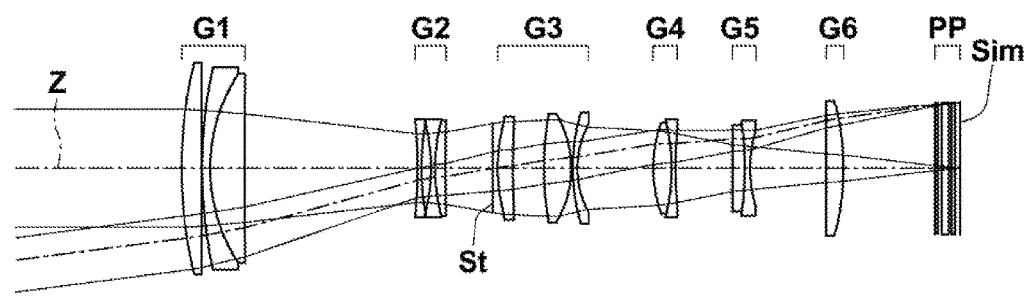
TELE
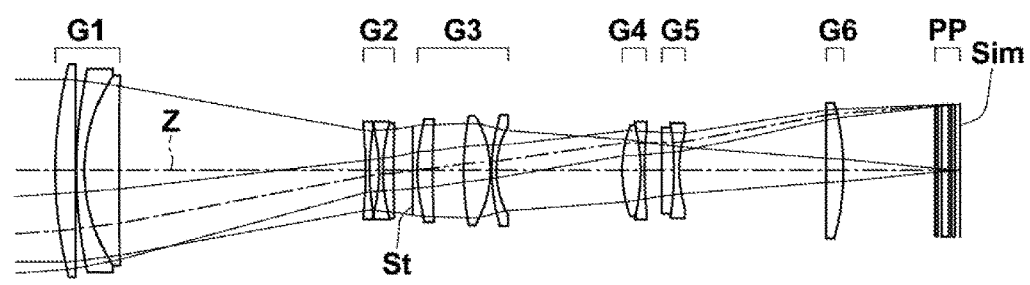

EXAMPLE 1

WIDE

MIDDLE

TELE

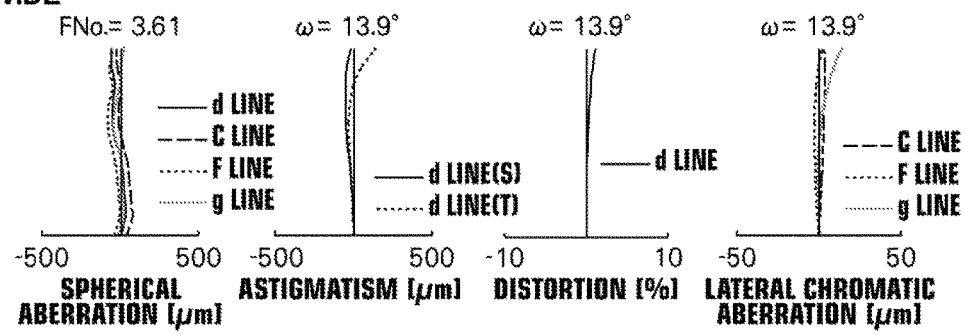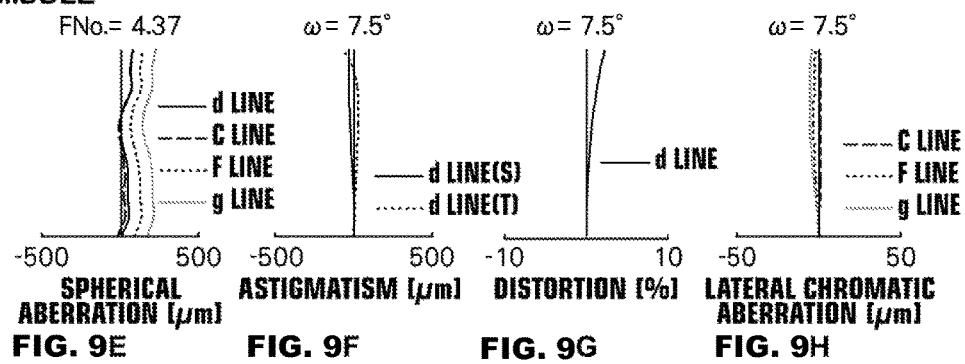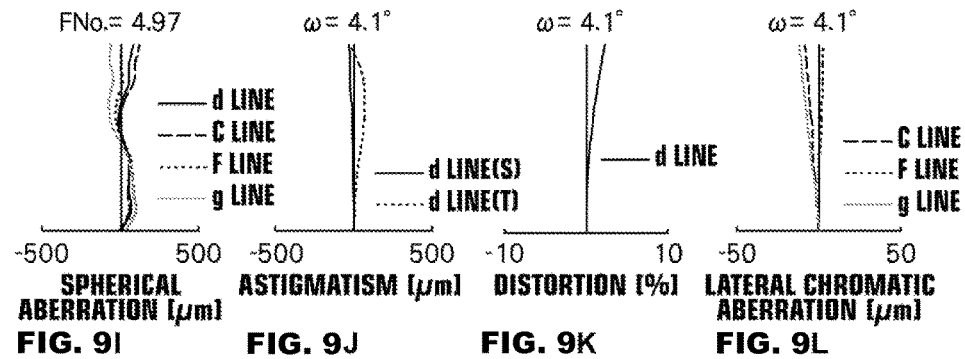

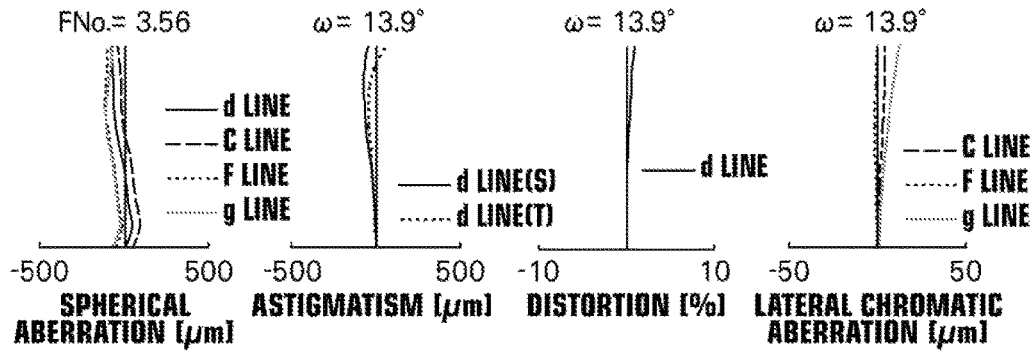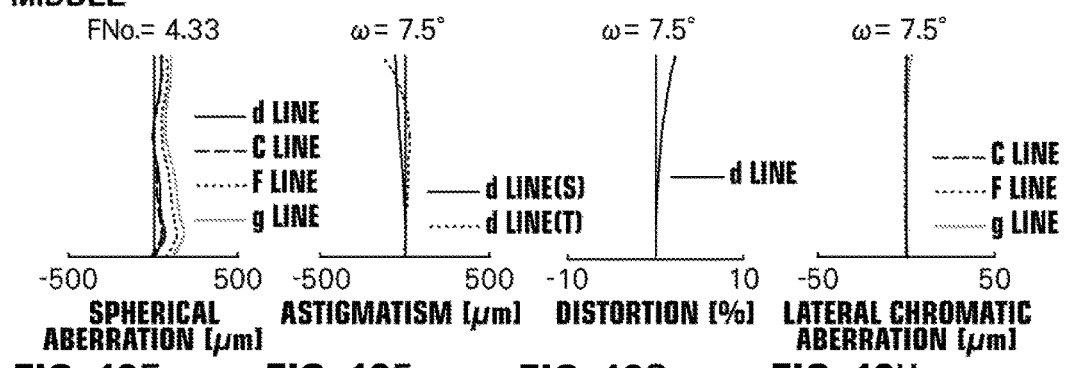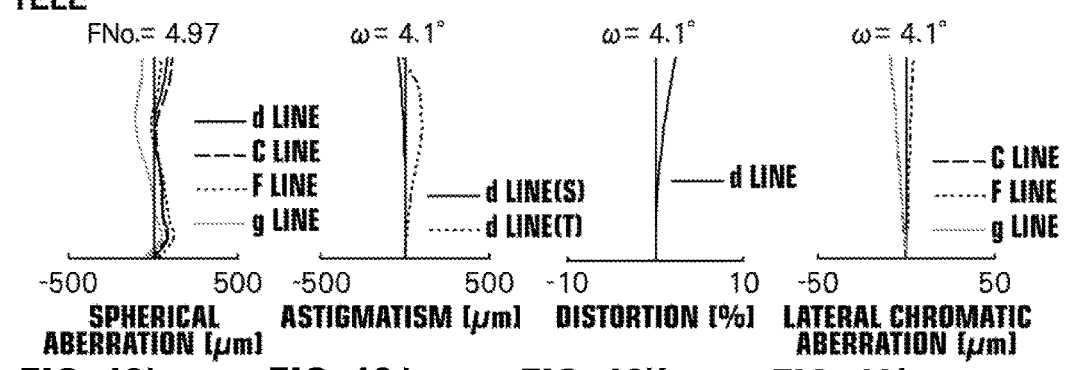

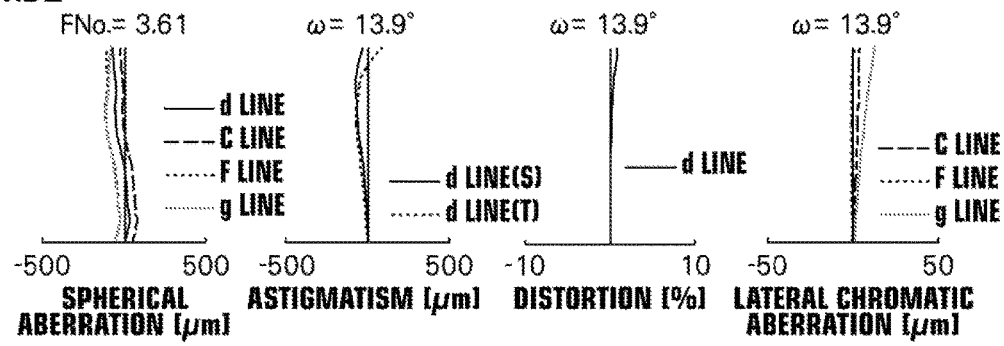
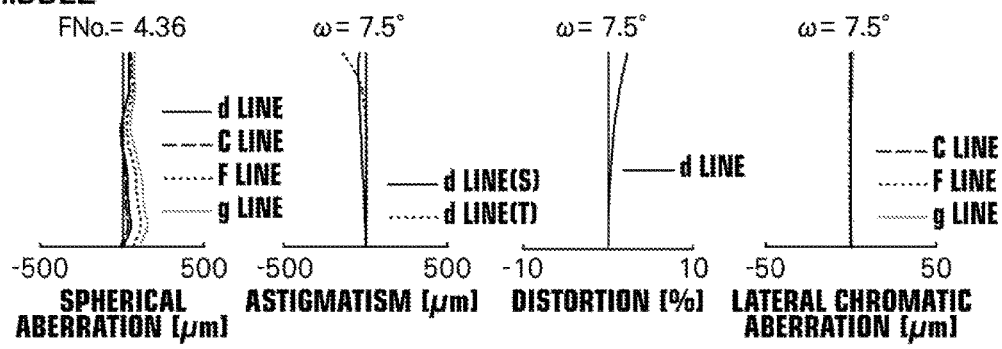
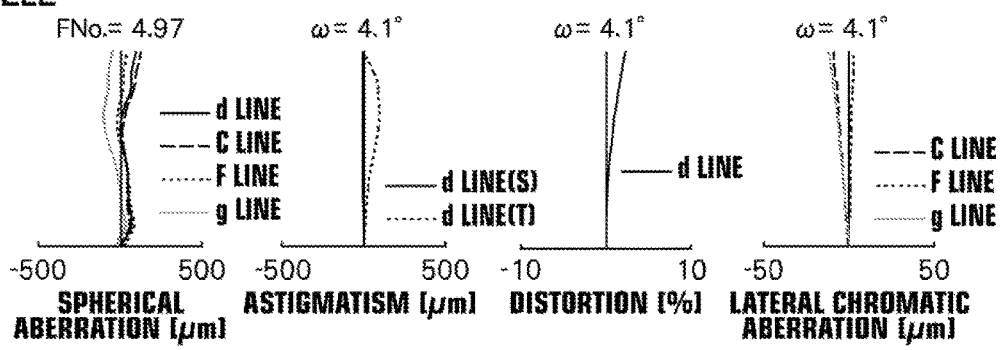

EXAMPLE 5

WIDE

MIDDLE

TELE

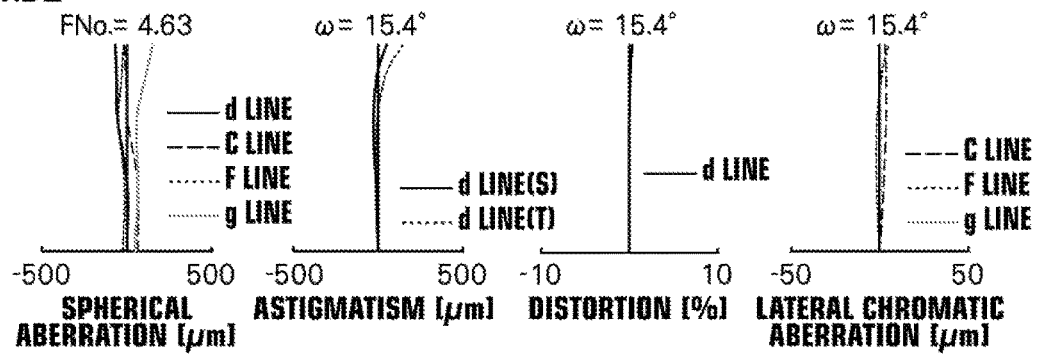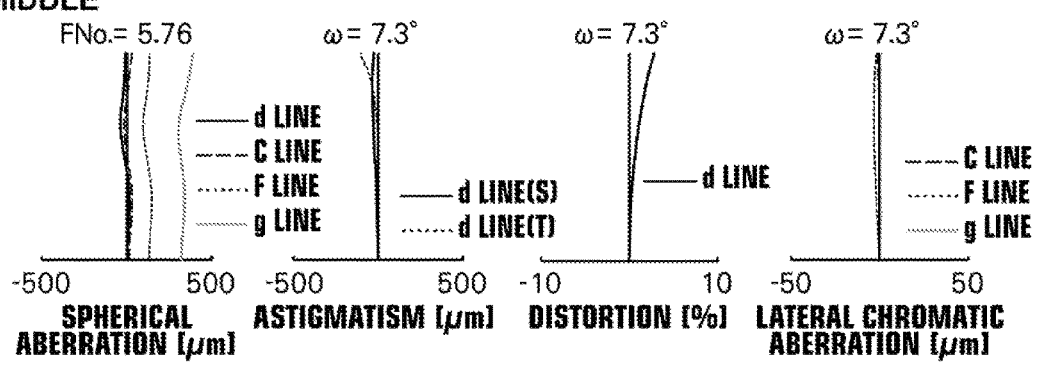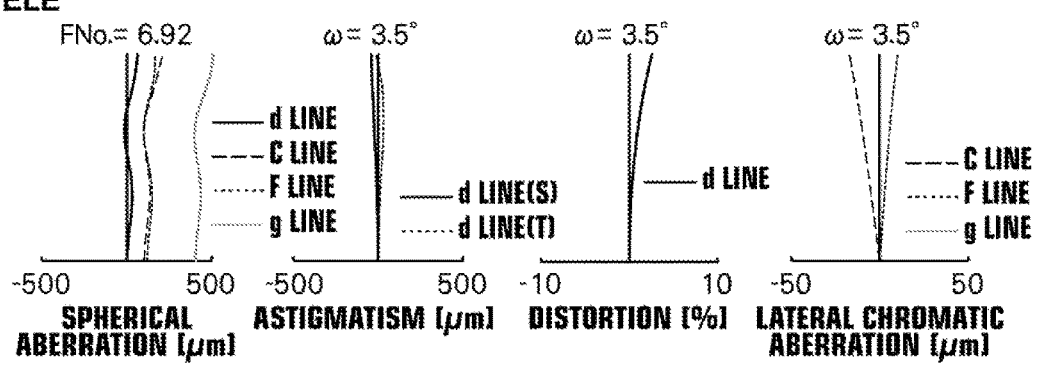

ZOOM LENS AND IMAGING APPARATUS

CROSS REFERENCE TO RELATED APPLICATIONS

The present application is a Continuation of PCT International Application No. PCT/JP2013/007607 filed on Dec. 26, 2013, which claims priority under 35 U.S.C. § 119(a) to Japanese Patent Application No. 2013-065916 filed on Mar. 27, 2013 and Japanese Patent Application No. 2013-196515 filed on Sep. 24, 2013. Each of the above applications is hereby expressly incorporated by reference in its entirety, into the present application.

BACKGROUND

The present disclosure is related to a zoom lens and an imaging apparatus. More specifically, the present disclosure is related to a zoom lens suited for digital cameras, cinematic cameras, broadcast cameras, etc., as well as an imaging apparatus equipped with such a zoom lens.

Conventionally, zoom lenses having six group configurations have been proposed, in response to demand for high performance zoom lenses. For example, Japanese Unexamined Patent Publication No. 2012-053444 discloses a zoom lens having a six group configuration, in which a first lens group having a positive refractive power, a second lens group having a negative refractive power, a third lens group having a positive refractive power, a fourth lens group having a positive refractive power, a fifth lens group having a negative refractive power, and a sixth lens group having a positive refractive power are arranged in order from the object side to the image side, particularly as a telephoto zoom lens. Japanese Unexamined Patent Publication No. 2005-352057 discloses a zoom lens having a six group configuration with the same power arrangement.

SUMMARY

Demand for compact and high performance zoom lenses is increasing recently, accompanying the spread of so called non reflex interchangeable lens cameras. In this type of camera, it is desired for a lens for this type of camera to be of a compact configuration both when stored and carried and when mounted on a camera and utilized. For this reason, there is demand for a zoom lens in which the total length of the lens system is short in both a stored state and in a state of use. This demand is particularly great for telephoto type zoom lenses, which have lens systems with longer total lengths than those of wide angle type zoom lenses and standard type zoom lenses.

However, the zoom lens disclosed in Japanese Unexamined Patent Publication No. 2012-053444 has a problem that the total length of the lens system, and particularly the total length of the lens system at the wide angle end, is not sufficiently short. In addition, the zoom lens having the six group configuration disclosed in Japanese Unexamined Patent Publication No. 2005-352057 is a standard zoom lens, and there is a problem that if the configuration is applied to a telephoto zoom lens, the total length of the lens system will not be sufficiently short.

The present disclosure has been developed in view of the foregoing points.

The present disclosure provides a zoom lens which is favorably suited as a telephoto type, has a lens system with a short total length in a stored state and in a state of use mounted in an imaging apparatus, corrects various aberrations, and has high optical performance. The present disclosure also provides an imaging apparatus equipped with such a zoom lens.

A zoom lens of the present disclosure consists essentially of six lens groups, which are, in order from the object side to the image side:
a first lens group having a positive refractive power;
a second lens group having a negative refractive power;
a third lens group having a positive refractive power;
a fourth lens group having a positive refractive power;
a fifth lens group having a negative refractive power; and
a sixth lens group having a positive refractive power;
the distances between all pairs of adjacent lens groups changing when changing magnification from the wide angle end to the telephoto end; and
Conditional Formula (1) below being satisfied:

$$-5 < f1/f2 < -1.5 \quad (1)$$

wherein f1 is the focal length of the first lens group, and f2 is the focal length of the second lens group.

In the zoom lens of the present disclosure, it is preferable for Conditional Formula (1-1) below to be satisfied, and more preferable for Conditional Formula (1-2) below to be satisfied.

$$-4.8 < f1/f2 < -2.5 \quad (1-1)$$

$$-4.6 < f1/f2 < -3.0 \quad (1-2)$$

In the zoom lens of the present disclosure, it is preferable for the distance between the fourth lens group and the fifth lens group to be shorter at the telephoto end than at the wide angle end.

In the zoom lens of the present disclosure, it is preferable for the third lens group to be positioned more toward the object side at the telephoto end than at the wide angle end.

In the zoom lens of the present disclosure, it is preferable for the distance between the third lens group and the fourth lens group to be shortest at the wide angle end.

In the zoom lens of the present disclosure, it is preferable for Conditional Formula (2) to be satisfied, more preferable for Conditional Formula (2-1) to be satisfied, and even more preferable for Conditional Formula (2-2) to be satisfied.

$$0.04 < d1w/f1 < 0.3 \quad (2)$$

$$0.08 < d1w/f1 < 0.2 \quad (2-1)$$

$$0.11 < d1w/f1 < 0.2 \quad (2-2)$$

wherein d1w is the distance along the optical axis between the first lens group and the second lens group at the wide angle end.

In the zoom lens of the present disclosure, it is preferable for focusing operations to be performed by moving the fourth lens group in the direction of the optical axis.

In the zoom lens of the present disclosure, it is preferable for image blurs to be corrected by moving the second lens group in a direction having a component perpendicular to the optical axis.

In the zoom lens of the present disclosure, it is preferable for the first lens group to consist essentially of, in order from the object side to the image side, a positive lens and a cemented lens formed by cementing a negative lens and a positive lens provided in this order from the object side to the image side together.

In the zoom lens of the present disclosure, it is preferable for the third lens group to have a negative meniscus lens with a concave surface toward the image side as the lens most toward the image side.

In the zoom lens of the present disclosure, the fourth lens group may consist essentially of a cemented lens formed by cementing a biconvex lens and a biconcave lens together.

Alternatively, the fourth lens group may consist essentially of a single positive meniscus lens with a convex surface toward the object side.

In the zoom lens of the present disclosure, the second lens group may consist essentially of, in order from the object side to the image side, a biconcave lens in which the absolute value of the radius of curvature of the surface toward the image side is less than the absolute value of the radius of curvature of the surface toward the object side, and a cemented lens formed by cementing a biconcave lens and a positive meniscus lens with a convex surface toward the object side, provided in this order from the object side to the image side, together.

Alternatively, the second lens group may consist essentially of, in order from the object side to the image side, a cemented lens formed by cementing a biconcave lens in which the absolute value of the radius of curvature of the surface toward the image side is less than the absolute value of the radius of curvature of the surface toward the object side and a positive meniscus lens with a convex surface toward the object side, provided in this order from the object side to the image side, together, and a negative meniscus lens with a concave surface toward the object side.

An imaging apparatus of the present disclosure is equipped with the zoom lens of the present disclosure described above.

Note that the above expression "lens group" refers not only to lens groups constituted by a plurality of lenses, but also includes lens groups constituted by a single lens.

Note that the term "essentially" in the expressions "consists essentially of" and "consist essentially of" above means that the zoom lens of the present disclosure may also include lenses that practically have no power, optical elements other than lenses such as a stop, a cover glass, and filters, and mechanical components such as lens flanges, a lens barrel, a camera shake correcting mechanism, etc., in addition to the constituent elements listed above.

Note that the signs of the refractive powers and the surface shapes of lenses in the zoom lens of the present disclosure will be considered in the paraxial region for lenses that include aspherical surfaces.

According to the present disclosure, the arrangement of powers of the lens groups is favorably set, the distances among the lens groups change when changing magnification, and a predetermined conditional formula is satisfied in a zoom lens system having a six lens group configuration. Therefore, a zoom lens which is favorably suited as a telephoto type, has a lens system with a short total length in a stored state and in a state of use, corrects various aberrations, and has high optical performance can be realized. In addition, an imaging apparatus equipped with this zoom lens can also be realized.

BRIEF DESCRIPTION OF THE DRAWINGS

FIG. 1 is a collection of sectional diagrams that illustrate the lens configuration of a zoom lens according to Example 1 of the present disclosure.

FIG. 2 is a collection of sectional diagrams that illustrate the lens configuration of a zoom lens according to Example 2 of the present disclosure.

FIG. 3 is a collection of sectional diagrams that illustrate the lens configuration of a zoom lens according to Example 3 of the present disclosure.

FIG. 4 is a collection of sectional diagrams that illustrate the lens configuration of a zoom lens according to Example 4 of the present disclosure.

FIG. 5 is a collection of sectional diagrams that illustrate the lens configuration of a zoom lens according to Example 5 of the present disclosure.

FIG. 6 is a collection of sectional diagrams that illustrate the lens configuration of a zoom lens according to Example 6 of the present disclosure.

FIG. 7 is a collection of diagrams that illustrate axial light beams and off axis light beams that pass through the zoom lens of FIG. 1 at the wide angle end, in a state at an intermediate focal length, and at the telephoto end.

FIGS. 9A through 9L are a collection of diagrams that illustrate various aberrations of the zoom lens of Example 2.

FIGS. 10A through 10L are a collection of diagrams that illustrate various aberrations of the zoom lens of Example 3.

FIGS. 11A through 11L are a collection of diagrams that illustrate various aberrations of the zoom lens of Example 4.

FIGS. 13A through 13L are a collection of diagrams that illustrate various aberrations of the zoom lens of Example 6.

DETAILED DESCRIPTION OF THE PREFERRED EMBODIMENTS

Figure 8A:
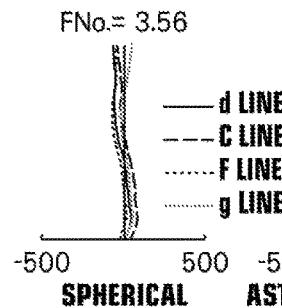
FIGS. 8A through 8L are a collection of diagrams that illustrate various aberrations of the zoom lens of Example 1.
Figure 8B:
Figure 8C:
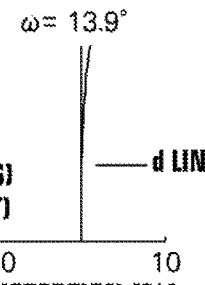
Figure 8D:
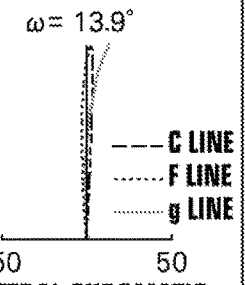
Figure 8E:
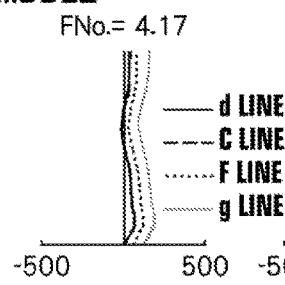
Figure 8F:
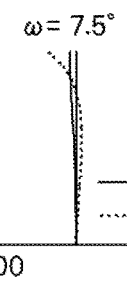
Figure 8G:
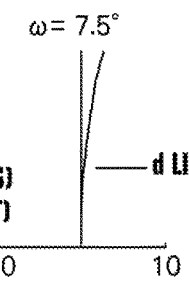
Figure 8H:
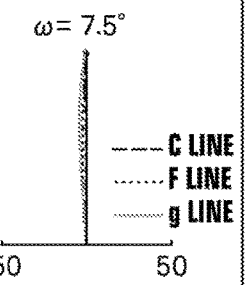
Figure 8I:
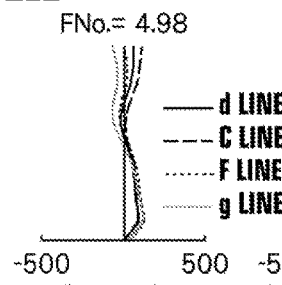
Figure 8J:
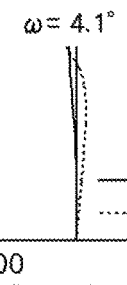
Figure 8K:
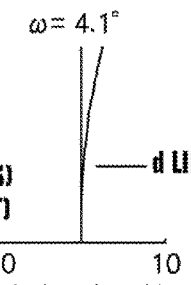
Figure 8L:
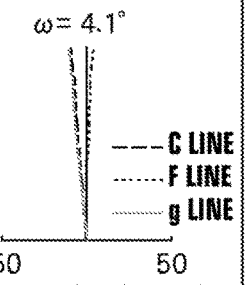
Figures 12A, 12B, 12C, 12D:
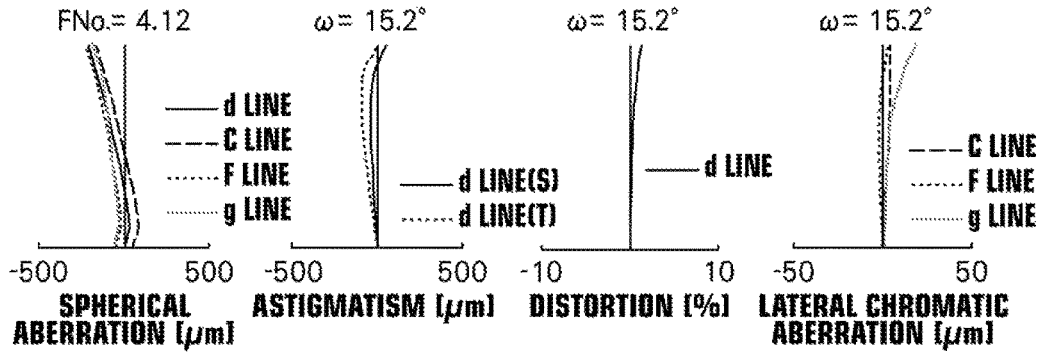
FIGS. 12A through 12L are a collection of diagrams that illustrate various aberrations of the zoom lens of Example 5.
Figures 12E, 12F, 12G, 12H:
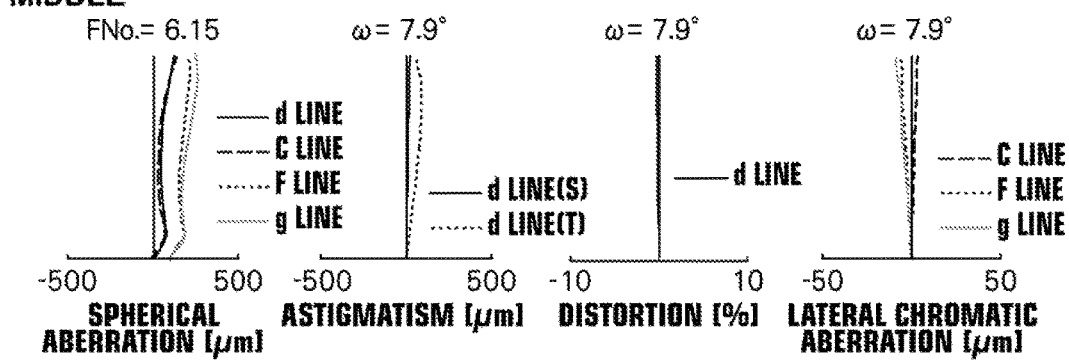
Figures 12I, 12J, 12K, 12L:
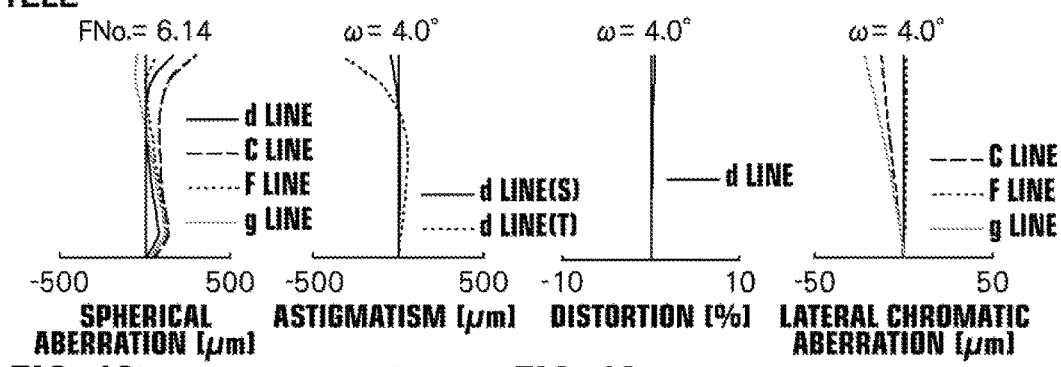

Hereinafter, embodiments of the present disclosure will be described in detail with reference to the accompanying drawings. FIG. 1 is a collection of sectional diagrams that illustrate of a zoom lens according to an embodiment of the present disclosure. The upper portion of FIG. 1 labeled "WIDE" and the lower portion of FIG. 1 labeled "TELE" respectively illustrate the lens configurations of the lens at the wide angle end and at the telephoto end. The curved lines and the straight line illustrated between the upper portion and the lower portion of FIG. 1 denote the movement trajectories of each lens group when changing magnification from the wide angle end to the telephoto end. The straight line illustrated between the upper portion and the lower portion of FIG. 1 which are perpendicular to an optical axis Z indicate that the lens group does not move when changing magnification. The example illustrated in FIG. 1 corresponds to Example 1 to be described later. Similarly, examples of configurations that correspond to Examples 2 through 6 to be described later are illustrated in FIG. 2 through FIG. 6. The basic configurations of the examples illustrated in FIG. 1 through FIG. 6 are the same. Therefore, a description will be mainly given using the configuration illustrated in FIG. 1 as a base.

This zoom lens is capable of being mounted on imaging apparatuses such as a digital camera, a cinematic camera, a broadcast camera, etc. In the imaging apparatus, a CCD (Charge Coupled Device), a CMOS (Complementary Metal Oxide Semiconductor), for example, is provided such that the imaging surface thereof is positioned at the imaging surface Sim of the zoom lens as an imaging element 5. It is preferable for a cover glass for protecting the imaging surface of the imaging element 5 and various filters, such as a low pass filter and an infrared ray cutoff filter, to be provided between the zoom lens and the imaging surface, depending on the specification of the imaging apparatus. FIG. 1 illustrates an example in which a parallel plate shaped optical member PP that presumes such components is provided between the lens system and the imaging surface Sim.

The zoom lens consists essentially of six lens groups, which are, in order from the object side to the image side: a first lens group G1 having a positive refractive power; a second lens group G2 having a negative refractive power; a third lens group G3 having a positive refractive power; a fourth lens group G4 having a positive refractive power; a fifth lens group G5 having a negative refractive power; and a sixth lens group G6 having a positive refractive power. An aperture stop St is provided between the second lens group G2 and the third lens group G3, in the vicinity of the object side of the third lens group G3. Note that the aperture stop St illustrated in FIG. 1 does not necessary represent the size or shape thereof, but indicates the position thereof along the optical axis Z.

Configuring the first lens group G1 to be a lens group having a positive refractive power is advantageous from the viewpoint of shortening the total length of the lens system. Configuring the second lens group G2 to be a lens group having a negative refractive power enables the main magnification changing function to be distributed. Configuring the third lens group G3 and the fourth lens group G4 to be lens groups having positive refractive powers and changing the air distance between the object side of the third lens group G3 and the image side of the fourth lens group G4 when changing magnification is advantageous from the viewpoint of suppressing fluctuations in various aberrations including spherical aberration when changing magnification. Configuring the fifth lens group G5 to be a lens group having a negative refractive power is advantageous from the viewpoint of shortening the total length of the lens system. Configuring the sixth lens group G6 to be a lens group having a positive refractive power enables increases in the incident angles at which principal light rays of off axis light rays enter the imaging surface Sim (the imaging element 5) to be suppressed, and can suppress shading.

In addition, this zoom lens is configured such that the distances between all pairs of adjacent lens groups change when changing magnification from the wide angle end to the telephoto end. Adopting this configuration is advantageous from the viewpoint of suppressing fluctuations in various aberrations including spherical aberration when changing magnification.

The example illustrated in FIG. 1 is configured such that the distance between the first lens group G1 and the second lens group G2 constantly increases when changing magnification from the wide angle end to the telephoto end, the distance between the second lens group G2 and the third lens group G3 constantly decreases when changing magnification from the wide angle end to the telephoto end, the distance between the third lens group G3 and the fourth lens group G4 is shortest at the wide angle end, the distance between the fourth lens group G4 and the fifth lens group G5 is shorter at the telephoto end than at the wide angle end, and the distance between the fifth lens group G5 and the sixth lens group G6 is longer at the telephoto end than at the wide angle end. By adopting this configuration, the magnification changing function can be borne by lens groups other than the second lens group G2, which is advantageous from the viewpoint of suppressing fluctuations in various aberrations when changing magnification.

The sixth lens group G6 may be configured such that it is fixed with respect to the imaging surface Sim when changing magnification. Adopting this configuration is advantageous from the viewpoint of suppressing fluctuations in lateral chromatic aberration and distortion when changing magnification. In addition, a dust proofing effect that prevents dust from entering the lens system from the image side can also be expected.

The first lens group G1 may be configured by three lenses L11 through L13, for example. In greater detail, it is preferable for the first lens group G1 to consist essentially of, in order from the object side to the image side, a positive lens and a cemented lens formed by cementing a negative lens and a positive lens provided in this order from the object side to the image side together. Adopting this configuration is advantageous from the viewpoint of suppressing longitudinal chromatic aberration and differences in spherical aberration depending on wavelengths at the telephoto end. As a result, realizing an optical system having a small F number at the telephoto end is facilitated. This configuration is particularly advantageous in a telephoto zoom lens, in which longitudinal chromatic aberration and differences in spherical aberration depending on wavelengths at the telephoto end are large problems. In the case that the first lens group G1 is of a three lens configuration, it is preferable for the positive lens at the most object side to be a planoconvex lens having a convex surface toward the object side or a positive meniscus lens with a convex surface toward the object side, for the negative lens to be a negative meniscus lens with a convex surface toward the object side, and for the positive lens at the most image side to be a positive meniscus lens with a convex surface toward the object side.

The second lens group G2 may be constituted by three lenses L21 through L23, for example. In greater detail, the second lens group G2 may consist essentially of, in order from the object side to the image side, a biconcave lens in which the absolute value of the radius of curvature of the surface toward the image side is less than the absolute value of the radius of curvature of the surface toward the object side and a cemented lens formed by cementing a biconcave lens and a positive meniscus lens with a convex surface toward the object side, provided in this order from the object side to the image side, together. Adopting this configuration is advantageous from the viewpoint of suppressing fluctuations in astigmatism when changing magnification. In addition, in the case that the second lens group G2 is moved in a direction having a component perpendicular to the optical axis Z to correct camera shake, such a configuration is advantageous from the viewpoint of suppressing fluctuations in astigmatism when correcting camera shake.

Alternatively, the second lens group G2 may consist essentially of, in order from the object side to the image side, a cemented lens formed by cementing a biconcave lens in which the absolute value of the radius of curvature of the surface toward the image side is less than the absolute value of the radius of curvature of the surface toward the object side and a positive meniscus lens with a convex surface toward the object side, provided in this order from the object side to the image side, together, and a negative meniscus lens with a concave surface toward the object side. This configuration is advantageous from the viewpoint of correcting spherical aberration, particularly at the telephoto end. In addition, in the case that the second lens group G2 is moved in a direction having a component perpendicular to the optical axis Z to correct camera shake, such a configuration is advantageous from the viewpoint of suppressing fluctuations in spherical aberration when correcting camera shake.

The third lens group G3 may be constituted by three lenses L31 through L33, for example. In greater detail, it is preferable for the third lens group G3 to consist essentially of, in order from the object side to the image side, a positive lens, a positive lens, and a negative meniscus lens with a concave surface toward the image side. In this case, the third lens group 3 may be constituted by, in order from the object side to the image side, a positive meniscus lens with a convex surface toward the object side, a biconvex lens, and a negative meniscus lens with a concave surface toward the image side. In this case, such a configuration is advantageous from the viewpoint of suppressing high order spherical aberration. As a result, realizing an optical system having a small F number is facilitated. In this case, both surfaces of the positive meniscus lens provided most toward the object side within the third lens group G3 may be aspherical. Such a configuration is advantageous from the viewpoint of correcting spherical aberration. In addition, the lens provided most toward the object side within the third lens group G3 may be a positive lens with a compound aspherical surface formed on the object side thereof. In this case, such a configuration is advantageous from the viewpoint of correcting spherical aberration and longitudinal chromatic aberration. Note that it is preferable for the third lens group G3 to have a negative meniscus lens with a concave surface toward the image side as the lens provided most toward the image side. This configuration is advantageous from the viewpoint of suppressing high order spherical aberration. As a result, realizing an optical system having a small F number is facilitated.

The fourth lens group G4 may be constituted by two lenses, a lens L41 and a lens L42, for example. In greater detail, the fourth lens group G4 may be constituted essentially by a cemented lens formed by cementing a biconvex lens and a biconcave lens together. This configuration is advantageous from the viewpoint of suppressing fluctuations in chromatic aberration when changing magnification. In addition, in the case that focusing operations are performed by moving the fourth lens group G4 in the direction of the optical axis and the fourth lens group is constituted by a cemented lens formed by cementing a biconvex lens and a biconcave lens together, such a configuration is advantageous from the viewpoint of suppressing fluctuations in spherical aberration and astigmatism accompanying focusing operations.

Alternatively, the fourth lens group G4 may be constituted by a single lens L41, for example. In greater detail, the fourth lens group G4 may be constituted essentially by a positive meniscus lens with a convex surface toward the object side. Thereby, in the case that focusing operations are performed by moving the fourth lens group G4 in the direction of the optical axis, such a configuration is advantageous from the viewpoint of suppressing fluctuations in spherical aberration accompanying focusing operations. In addition, the weight of the focusing lens can be reduced, and an advantageous effect that the burden borne by a focusing mechanism is reduced will become significant.

The fifth lens group G5 may be constituted by two lenses, a lens L51 and a lens L52, for example. In greater detail, the fifth lens group G5 may be constituted by, in order from the object side to the image side, a planoconvex lens with a convex surface toward the image side and a biconcave lens. This configuration is advantageous from the viewpoint of correcting astigmatism at the telephoto end. Alternatively, the fifth lens group G5 may be constituted by, in order from the object side to the image side, a biconvex lens and a biconcave lens. This configuration is more advantageous from the viewpoint of correcting astigmatism at the telephoto end.

The sixth lens group G6 may be constituted by a single lens L61, for example. In greater detail, the sixth lens group G6 may be constituted by a planoconvex lens with a convex surface toward the image side. Adopting a lens of this shape is advantageous from the viewpoint of suppressing fluctuations in astigmatism when changing magnification. Alternatively, the sixth lens group G6 may be constituted by a positive meniscus lens with a convex surface toward the image side. In this case, the advantageous effect of suppressing fluctuations in astigmatism will become more significant.

In this zoom lens, Conditional Formula (1) below is satisfied.

$$-5 < f1/f2 < -1.5 \qquad (1)$$

wherein f1 is the focal length of the first lens group G1, and f2 is the focal length of the second lens group G2.

Generally, in zoom lenses having six group configurations with the power arrangement as in the present embodiment, the amount of movement of the first lens group G1 is great when changing magnification. This amount of movement greatly influences the total length of the lens system. In addition, the second lens group G2 bears a large portion of the magnification changing function. Therefore, the influence imparted by the second lens group G2 on the entire lens system with respect to aberrations and changing magnification is great. For these reasons, it is important to define the ratio of the refractive powers of the first lens group G1 and the second lens group G2. Configuring the zoom lens such that the value of f1/f2 is not less than or equal to the lower limit defined in Conditional Formula (1) is advantageous from the viewpoint of suppressing various aberrations when changing magnification including distortion. Configuring the zoom lens such that the value of f1/f2 is not greater than or equal to the upper limit defined in Conditional Formula (1) is advantageous from the viewpoint of shortening the total length of the lens system at the wide angle end. In addition, the amount of movement of the first lens group G1 when changing magnification can be reduced, which is advantageous from the viewpoint of suppressing the amount of change of the total length of the lens system when changing magnification.

In this type of zoom lens, the total length of the lens system at the wide angle end greatly influences the length of the optical system in a stored state, and the total length of the lens system at the telephoto end greatly influences the maximum length of the optical system in a state of use. By shortening the total length of the lens system at the wide angle end, the zoom lens can be miniaturized in a stored state. In addition, by suppressing the amount of movement of the first lens group G1 when changing magnification, the total length of the lens system at the telephoto end can be shortened. As a result, the maximum length of the optical system in a state of use can be shortened, and an imaging apparatus can be miniaturized in a state of use. Further, the necessary length of a lens barrel can also be suppressed by suppressing the amount of movement of the first lens group G1 when changing magnification, which contributes to miniaturization of an imaging apparatus in a stored state.

Due to the circumstances above, it is more preferable for Conditional Formula (1-1) below to be satisfied, and even more preferable for Conditional Formula (1-2) below to be satisfied.

$$-4.8 < f1/f2 < -2.5 \tag{1-1}$$

$$-4.6 < f1/f2 < -3.0 \tag{1-2}$$

In this zoom lens, it is preferable for the distance between the fourth lens group G4 and the fifth lens group G5 to be shorter at the telephoto end than at the wide angle end. Thereby, the magnification changing function of the second lens group G2 can be distributed with the fourth lens group G4 and the fifth lens group G5, which is advantageous from the viewpoint of suppressing fluctuations in distortion when changing magnification. In addition, it becomes possible to shorten the total length of the lens system at the wide angle end even if the zoom ratio is set high, and to suppress fluctuations in the amount of change of the total length of the lens system.

In addition, it is preferable for the third lens group G3 to be positioned more toward the object side at the telephoto end than at the wide angle end with the imaging surface Sim as a reference in this zoom lens. Thereby, the distance between the second lens group G2 and the third lens group G3 at the telephoto end can be shortened, which is advantageous from the viewpoint of shortening the total length of the lens system when changing magnification.

In addition, it is preferable for the distance between the third lens group G3 and the fourth lens group G4 to be shortest at the wide angle end throughout the entire magnification range in this zoom lens. Thereby, the magnification changing function of the second lens group G2 can be distributed with the third lens group G3 and the fourth lens group G4, which is advantageous from the viewpoint of suppressing fluctuations in astigmatism when changing magnification. In addition, it becomes possible to shorten the total length of the lens system at the wide angle end even if the zoom ratio is set high, and to suppress fluctuations in the amount of change of the total length of the lens system.

As will be described later, it is preferable for focusing operations to be performed by the fourth lens group G4 in this zoom lens. In the case that focusing operations are performed by the fourth lens group G4 in this zoom lens, by configuring the distance between the third lens group G3 and the fourth lens group G4 to be shortest at the wide angle end, an advantageous effect, that photography of subjects at closer distances becomes possible at the telephoto end, is obtained. This is due to the reasons below. In the case that focusing operations are performed by the fourth lens group G4 having a positive refractive power, focusing operations are performed by moving the fourth lens group G4 toward the object side when the object distance moves from infinity to a close distance. The amount of movement of images when an object moves tends to be greater at the telephoto end than at the wide angle end, and the amount of movement of lens groups that move to perform focusing operations will increase at the telephoto end. Therefore, by configuring the zoom lens such that the distance between the third lens group G3 and the fourth lens group G4 to be shortest at the wide angle end, a greater distance will be present between the third lens group G3 and the fourth lens group G4 at the telephoto end. Thereby, a greater amount of movement becomes possible for the fourth lens group G4 which moves during focusing operations, and photography of subjects at closer distances will become possible.

In addition, it is preferable for Conditional Formula (2) below to be satisfied in this zoom lens.

$$0.04 < d1w/f1 < 0.3 \tag{2}$$

wherein d1w is the distance along the optical axis between the first lens group G1 and the second lens group G2 at the wide angle end.

By configuring the zoom lens such that the value of d1w/f1 is not less than or equal to the lower limit defined in Conditional Formula (2), the amount of movement of the first lens group G1 when changing magnification can be suppressed, which is advantageous from the viewpoint of suppressing the amount of change of the total length of the lens system when changing magnification. Configuring the zoom lens such that the value of d1w/f1 is not greater than or equal to the upper limit defined in Conditional Formula (2) is advantageous from the viewpoint of shortening total length of the lens system at the wide angle end. Miniaturization of an imaging apparatus in both a stored state and a state of use can be achieved by satisfying Conditional Formula (2), as in the case that the value of f1/f2 is not greater than or equal to the upper limit defined in Conditional Formula (1).

Due to the circumstances above, it is more preferable for Conditional Formula (2-1) below to be satisfied, and even more preferable for Conditional Formula (2-2) below to be satisfied.

$$0.08 < d1w/f1 < 0.2 \tag{2-1}$$

$$0.11 < d1w/f1 < 0.2 \tag{2-2}$$

In addition, it is preferable for focusing operations to be performed by moving the fourth lens group G4 in the direction of the optical axis in this zoom lens. FIG. 7 illustrates axial light beams and off axis light beams at a maximum angle of view together with lens configurations of the zoom lens of FIG. 1. In FIG. 7, "WIDE", "MIDDLE", and "TELE" respectively denote the wide angle end, an intermediate focal length, and the telephoto end. As can be understood from FIG. 7, there is little change in the emission angles of light rays due to magnification as the light rays pass through the third lens group G3, which is positioned in the vicinity of the midpoint of the entire lens system. For this reason by performing focusing operations using the fourth lens group G4, which is provided immediately toward the image side of the third lens group G3 is advantageous from the viewpoint of decreasing fluctuations in aberrations during focusing operations. As a result, fluctuations in spherical aberration and astigmatism during focusing operations can be suppressed. This advantageous effect will become more prominent in the case that the aperture stop St moves integrally with the third lens group G3 when changing magnification.

In addition, it is preferable for the second lens group G2 to be moved in a direction having a component perpendicular to the optical axis Z to correct image blur. That is, it is preferable for the zoom lens to be configured such that the second lens group G2 performs camera shake correcting operations. Generally, aberrations are corrected to a certain degree in each lens group of a zoom lens in order to suppress fluctuations in aberrations caused by the movement of each of the lens groups when changing magnification. Aberrations are corrected to a greater degree particularly in the second lens group G2, which bears a large portion of the magnification changing function, than in the other lens groups. By using such a second lens group G2 to correct camera shake, fluctuations in aberrations due to camera shake correcting operations can be decreased.

In addition, the second lens group G2 is a negative lens group provided immediately toward the image side of the first lens group G1 having a positive refractive power. Therefore, the amount of image blur correction with respect to the amount of movement of the second lens group G2 for camera shake correction can be increased. That is, it can be said that the second lens group G2 is a lens group that easily obtains a camera shake correcting effect with respect to the amount of movement thereof. Particularly in the case that the zoom lens is configured such that the value of f1/f2 is not greater than or equal to the upper limit defined in Conditional Formula (1), the maximum amount of movement of the second lens group G2 for camera shake correction can be maintained small, which contributes to miniaturization of an imaging apparatus.

A description has been given above mainly with reference to FIG. 1. However, the number of lenses that constitute each of the lens groups and the shapes of the lenses of the zoom lens of the present disclosure are not limited to the examples illustrated in FIG. 1, and other configurations may be adopted. In addition, arbitrary combinations of the preferred configurations and possible configurations are possible. It is preferable for the configurations described above to be selectively adopted as appropriate, according to specifications desired of the zoom lens.

Next, specific Examples of the zoom lens of the present disclosure will be described.

Example 1

The configuration of the zoom lens of Example 1 is illustrated in FIG. 1. Basic lens data are shown in Table 1, data related to various items and variable distances are shown in Table 2, and aspherical surface coefficients are shown in Table 3, for the zoom lens of Example 1.

In Table 1, ith (i=1, 2, 3, . . . ) surface numbers that sequentially increase from the object side to the image side, with the surface toward the object side of the constituent element at the most object side designated as first, are shown in the column Si. The radii of curvature of ith surfaces are shown in the column Ri, the distances between an ith surface and an i+1st surface along the optical axis Z are shown in the column Di. The refractive indices of jth (j=1, 2, 3, . . . ) constituent elements that sequentially increase from the object side to the image side, with the constituent element at the most object side designated as first, with respect to the d line (wavelength: 587.56 nm) are shown in the column Ndj. The Abbe's numbers of jth constituent elements with respect to the d line are shown in the column vdj.

In Table 1, the signs of the refractive indices are positive in cases that a surface shape is convex toward the object side, and negative in cases that a surface shape is convex toward the image side. Note that Table 1 also shows the aperture stop St, the optical member PP, and the imaging surface Sim. In Table 1, a surface number and text reading "(St)" is shown in the row of the surface number of the surface corresponding to the aperture stop, and a surface number and text reading "(Sim)" is shown in the row of the surface number of the surface corresponding to the imaging surface Sim.

DD[5], DD[10], DD[17], DD[20], and DD[23] in Column Di of Table 1 are the distances between surfaces that change while changing magnification. These distances respectively correspond to the distance between the first lens group G1 and the second lens group G2, the distance between the second lens group G2 and the aperture stop St, the distance between the third lens group G3 and the fourth lens group G4, the distance between the fourth lens group G4 and the fifth lens group G5, and the distance between the fifth lens group G5 and the sixth lens group G6.

Table 2 shows various items with respect to the d line and the values of the above variable distances among surfaces at the wide angle end, an intermediate focal distance (abbreviated to "Intermediate" in Table 2, etc.), and at the telephoto end. The item "f" in Table 2 is the focal length of the entire lens system, the item "F No." is the F number, and the item "2w" is the full angle of view (in units of degrees). In the lens data of Table 1, surface numbers of aspherical surfaces are denoted with the mark "*", and radii of curvature of paraxial regions are shown as the radii of curvature of the aspherical surfaces. Table 3 shows the aspherical surface coefficients of each of the aspherical surfaces. In the numerical values of the aspherical surface data of Table 3, "E-n (n: integer)" means "·10$^{-n}$". Note that the aspherical surface coefficients are the values of the coefficients KA and Am (m=3, 4, 5, . . . ) in the following aspherical surface formula:

$$Zd = C \cdot h^2 / \{1 + (1 - KA \cdot C^2 \cdot h^2)^{1/2}\} + \Sigma Am \cdot h^m$$

wherein: Zd is the depth of the aspherical surface (the length of a normal line from a point on the aspherical surface at a height h to a plane perpendicular to the optical axis in contact with the peak of the aspherical surface), h is height (the distance from the optical axis to the lens surface), C is the paraxial curvature, and KA and Am (m=3, 4, 5, . . . ) are aspherical surface coefficients.

Numerical values which are rounded off at a predetermined number of digits are shown in Table 1 through Table 3. In Table 1 through Table 3, mm are used as the units for lengths. However, it is possible for optical systems to be proportionately enlarged or proportionately reduced and utilized. Therefore, other appropriate units may be used.

TABLE 1

| Si | Ri | Di | Ndj | vdj |
|---|---|---|---|---|
| 1 | 93.4577 | 4.300 | 1.58913 | 61.14 |
| 2 | ∞ | 0.100 | | |
| 3 | 103.1337 | 1.710 | 1.58144 | 40.75 |
| 4 | 37.9520 | 7.150 | 1.49700 | 81.54 |
| 5 | 1295.9911 | DD[5] | | |
| 6 | −114.4807 | 0.840 | 1.88300 | 40.76 |
| 7 | 54.6230 | 1.998 | | |
| 8 | −39.7040 | 0.850 | 1.72916 | 54.68 |
| 9 | 39.7040 | 2.200 | 1.92286 | 20.88 |
| 10 | 503.7335 | DD[10] | | |
| 11 (St) | ∞ | 1.000 | | |
| *12 | 35.2473 | 3.200 | 1.72777 | 40.33 |
| *13 | 302.5188 | 6.510 | | |
| 14 | 68.0514 | 5.700 | 1.43875 | 94.93 |
| 15 | −23.0494 | 0.300 | | |
| 16 | 40.9271 | 1.000 | 1.84666 | 23.78 |
| 17 | 20.2890 | DD[17] | | |
| 18 | 28.8457 | 3.860 | 1.74320 | 49.34 |
| 19 | −43.3070 | 0.850 | 1.80100 | 34.97 |
| 20 | 107.9227 | DD[20] | | |
| 21 | ∞ | 2.610 | 1.92286 | 18.90 |
| 22 | −68.1850 | 1.100 | 1.72916 | 54.68 |
| 23 | 27.9438 | DD[23] | | |
| 24 | ∞ | 3.580 | 1.48749 | 70.23 |
| 25 | −55.5622 | 19.027 | | |
| 26 | ∞ | 0.600 | 1.54763 | 54.98 |
| 27 | ∞ | 0.810 | | |
| 28 | ∞ | 1.550 | 1.54763 | 54.98 |
| 29 | ∞ | 0.500 | | |
| 30 | ∞ | 0.700 | 1.49784 | 54.98 |
| 31 | ∞ | 1.120 | | |
| 32 (Sim) | ∞ | | | |

TABLE 2

|  | Wide Angle End | Intermediate | Telephoto End |
|---|---|---|---|
| Zoom Ratio | 1.0 | 1.9 | 3.4 |
| f | 56.68 | 104.94 | 194.28 |
| F No. | 3.56 | 4.17 | 4.98 |
| 2ω (°) | 27.8 | 15.0 | 8.2 |
| DD[5] | 14.332 | 36.233 | 51.700 |
| DD[10] | 15.857 | 10.029 | 3.968 |
| DD[17] | 6.488 | 15.986 | 26.427 |
| DD[20] | 15.478 | 11.858 | 3.530 |
| DD[23] | 6.213 | 16.113 | 30.932 |

TABLE 3

|  | Surface Number | |
|---|---|---|
|  | 12 | 13 |
| KA | 1.0000000E+00 | 1.0000000E+00 |
| A3 | −1.2149980E−05 | 8.2860572E−07 |
| A4 | 4.7067069E−06 | 1.5620450E−05 |
| A5 | −3.4603603E−06 | 4.0098895E−07 |
| A6 | 4.1742359E−07 | −3.0524648E−07 |
| A7 | −1.8773629E−08 | 4.2803201E−08 |
| A8 | −1.2486166E−09 | −4.0112483E−10 |
| A9 | 9.5621054E−11 | −3.4720627E−10 |
| A10 | −5.6719225E−12 | 1.4077889E−11 |

The spherical aberration, the astigmatic aberration, the distortion, and the lateral chromatic aberration (aberration of magnification) of the zoom lens of Example 1 at the wide angle end are illustrated in FIGS. 8A through 8D, respectively. The spherical aberration, the astigmatic aberration, the distortion, and the lateral chromatic aberration (aberration of magnification) of the zoom lens of Example 1 at an intermediate focal length are illustrated in FIGS. 8E through 8H, respectively. The spherical aberration, the astigmatic aberration, the distortion, and the lateral chromatic aberration (aberration of magnification) of the zoom lens of Example 1 at the telephoto end are illustrated in I through L of FIG. 8, respectively. All of A through L of FIG. 8 are for cases in which the zoom lens is focused on an object at infinity.

Each of the diagrams that illustrate aberrations show aberrations related to the d line. The diagrams that illustrate spherical aberration also show aberrations related to the C line (wavelength: 656.27 nm), aberrations related to the F line (wavelength: 486.13 nm), and the g line (wavelength: 435.84 nm). The diagrams that illustrate lateral chromatic aberration also illustrate aberrations related to the C line, the F line, and the g line. In the diagrams that illustrate astigmatic aberrations, aberrations in the sagittal direction are indicated by solid lines denoted by (S), while aberrations in the tangential direction are indicated by dotted lines denoted by (T). In the diagrams that illustrate spherical aberrations, "F No." denotes F values. In the other diagrams that illustrate the aberrations, "ω" denotes half angles of view.

The symbols, the meanings, and the manners in which the various pieces of data are described in the description of Example 1 above are the same for the examples to be described below unless otherwise noted. Therefore, redundant portions will be omitted from the following descriptions of the other examples.

Example 2

The lens configuration of the zoom lens of Example 2 is illustrated in FIG. 2. Table 4, Table 5, and Table 6 respectively show basic lens data, items and variable distances, and aspherical surface coefficients for the zoom lens of Example 2. FIGS. 9A through 9L are diagrams that illustrate the aberrations of the zoom lens of Example 2.

TABLE 4

| Si | Ri | Di | Ndj | νdj |
|---|---|---|---|---|
| 1 | 91.9997 | 4.300 | 1.58913 | 61.14 |
| 2 | 32728.3506 | 0.100 | | |
| 3 | 103.5029 | 1.710 | 1.57501 | 41.50 |
| 4 | 37.1562 | 7.100 | 1.49700 | 81.54 |
| 5 | 800.6980 | DD[5] | | |
| 6 | −138.7104 | 0.840 | 1.88300 | 40.76 |
| 7 | 50.2907 | 2.082 | | |
| 8 | −39.0158 | 0.850 | 1.72916 | 54.68 |
| 9 | 41.0606 | 2.300 | 1.92286 | 20.88 |
| 10 | 699.9873 | DD[10] | | |
| 11 (St) | ∞ | 1.000 | | |
| *12 | 31.9576 | 3.200 | 1.72777 | 40.33 |
| *13 | 165.8017 | 6.466 | | |
| 14 | 46.3121 | 5.750 | 1.43387 | 95.20 |
| 15 | −25.9999 | 0.300 | | |
| 16 | 36.9852 | 1.000 | 1.84666 | 23.78 |
| 17 | 18.6214 | DD[17] | | |
| 18 | 27.9645 | 3.910 | 1.75700 | 47.82 |
| 19 | −39.7835 | 0.850 | 1.80100 | 34.97 |
| 20 | 98.3760 | DD[20] | | |
| 21 | 2313.4207 | 2.473 | 1.92286 | 18.90 |
| 22 | −69.8033 | 1.000 | 1.72916 | 54.68 |
| 23 | 27.5001 | DD[23] | | |
| 24 | ∞ | 4.000 | 1.48749 | 70.23 |
| 25 | −56.2921 | 18.919 | | |
| 26 | ∞ | 0.590 | 1.54763 | 54.98 |
| 27 | ∞ | 0.810 | | |
| 28 | ∞ | 1.450 | 1.54763 | 54.98 |
| 29 | ∞ | 0.500 | | |
| 30 | ∞ | 0.700 | 1.49784 | 54.98 |
| 31 | ∞ | 1.119 | | |
| 32 (Sim) | ∞ | | | |

TABLE 5

|  | Wide Angle End | Intermediate | Telephoto End |
|---|---|---|---|
| Zoom Ratio | 1.0 | 1.9 | 3.4 |
| f | 56.68 | 104.94 | 194.28 |
| F No. | 3.61 | 4.37 | 4.97 |
| 2ω (°) | 27.8 | 15.0 | 8.2 |
| DD[5] | 13.943 | 33.847 | 52.363 |
| DD[10] | 16.147 | 9.748 | 4.011 |
| DD[17] | 6.416 | 14.771 | 25.342 |
| DD[20] | 14.410 | 11.839 | 3.412 |
| DD[23] | 7.289 | 19.607 | 31.197 |

TABLE 6

|  | Surface Number | |
|---|---|---|
|  | 12 | 13 |
| KA | 1.0000000E+00 | 1.0000000E+00 |
| A3 | −1.3337754E−05 | −3.3469314E−06 |
| A4 | 4.4407315E−06 | 1.4768925E−05 |
| A5 | −3.8106054E−06 | −3.0380374E−07 |
| A6 | 4.3233926E−07 | −2.7037580E−07 |
| A7 | −1.7323699E−08 | 4.4505911E−08 |
| A8 | −1.1735316E−09 | −3.7651521E−10 |
| A9 | 9.8451835E−11 | −3.4772994E−10 |
| A10 | −5.5841669E−12 | 1.4037679E−11 |

Example 3

The lens configuration of the zoom lens of Example 3 is illustrated in FIG. 3. Table 7, Table 8, and Table 9 respectively show basic lens data, items and variable distances, and aspherical surface coefficients for the zoom lens of Example 3. FIGS. 10A through 10L are diagrams that illustrate the aberrations of the zoom lens of Example 3.

TABLE 7

| Si | Ri | Di | Ndj | νdj |
|---|---|---|---|---|
| 1 | 93.4870 | 4.300 | 1.67790 | 55.34 |
| 2 | ∞ | 0.100 | | |
| 3 | 101.8798 | 1.710 | 1.60342 | 38.03 |
| 4 | 37.9358 | 7.100 | 1.49700 | 81.54 |
| 5 | 421.0260 | DD[5] | | |
| 6 | −232.2650 | 0.849 | 1.80610 | 40.92 |
| 7 | 18.5288 | 2.481 | 1.92286 | 20.88 |
| 8 | 41.9092 | 2.159 | | |
| 9 | −43.0062 | 0.800 | 1.88300 | 40.76 |
| 10 | −2082.9947 | DD[10] | | |
| 11 (St) | ∞ | 1.000 | | |
| *12 | 32.9318 | 3.200 | 1.72777 | 40.33 |
| *13 | 156.9787 | 6.554 | | |
| 14 | 72.9948 | 5.750 | 1.43875 | 94.93 |
| 15 | −22.9991 | 0.300 | | |
| 16 | 39.5181 | 1.000 | 1.84666 | 23.78 |
| 17 | 20.3004 | DD[17] | | |
| 18 | 28.9403 | 3.910 | 1.75700 | 47.82 |
| 19 | −40.7118 | 0.850 | 1.80100 | 34.97 |
| 20 | 115.5822 | DD[20] | | |
| 21 | ∞ | 2.353 | 1.92286 | 18.90 |
| 22 | −69.0045 | 1.500 | 1.69680 | 55.53 |
| 23 | 26.9603 | DD[23] | | |
| 24 | ∞ | 3.939 | 1.48749 | 70.23 |
| 25 | −58.4259 | 18.925 | | |
| 26 | ∞ | 0.590 | 1.54763 | 54.98 |
| 27 | ∞ | 0.810 | | |
| 28 | ∞ | 1.450 | 1.54763 | 54.98 |
| 29 | ∞ | 0.500 | | |
| 30 | ∞ | 0.700 | 1.49784 | 54.98 |
| 31 | ∞ | 1.126 | | |
| 32 (Sim) | ∞ | | | |

TABLE 8

| | Wide Angle End | Intermediate | Telephoto End |
|---|---|---|---|
| Zoom Ratio | 1.0 | 1.9 | 3.4 |
| f | 56.68 | 104.94 | 194.28 |
| F No. | 3.56 | 4.33 | 4.97 |
| 2ω (°) | 27.8 | 15.0 | 8.2 |
| DD[5] | 13.131 | 31.774 | 49.959 |
| DD[10] | 16.697 | 9.788 | 4.103 |
| DD[17] | 6.364 | 14.892 | 26.104 |
| DD[20] | 14.463 | 12.171 | 3.475 |
| DD[23] | 6.922 | 19.553 | 32.031 |

TABLE 9

| | Surface Number | |
|---|---|---|
| | 12 | 13 |
| KA | 1.0000000E+00 | 1.0000000E+00 |
| A3 | −1.5647933E−05 | −1.8421397E−06 |
| A4 | 5.7892400E−06 | 1.6258537E−05 |
| A5 | −3.5709865E−06 | 5.1130288E−07 |
| A6 | 4.1487145E−07 | −3.2584405E−07 |

TABLE 9-continued

| | Surface Number | |
|---|---|---|
| | 12 | 13 |
| A7 | −1.9110960E−08 | 4.2201496E−08 |
| A8 | −1.2738937E−09 | −4.0993561E−10 |
| A9 | 9.4466994E−11 | −3.4699955E−10 |
| A10 | −5.7099924E−12 | 1.4095854E−11 |

Example 4

The lens configuration of the zoom lens of Example 4 is illustrated in FIG. 4. Table 10, Table 11, and Table 12 respectively show basic lens data, items and variable distances, and aspherical surface coefficients for the zoom lens of Example 4. FIGS. 11A through 11L are diagrams that illustrate the aberrations of the zoom lens of Example 4.

TABLE 10

| Si | Ri | Di | Ndj | νdj |
|---|---|---|---|---|
| 1 | 96.3712 | 4.300 | 1.65160 | 58.55 |
| 2 | ∞ | 0.100 | | |
| 3 | 101.4983 | 1.710 | 1.60342 | 38.03 |
| 4 | 39.7747 | 7.100 | 1.49700 | 81.54 |
| 5 | 486.9366 | DD[5] | | |
| 6 | −300.8962 | 0.849 | 1.78590 | 44.20 |
| 7 | 19.1063 | 2.350 | 1.92286 | 20.88 |
| 8 | 39.7031 | 2.250 | | |
| 9 | −41.8883 | 0.800 | 1.88300 | 40.76 |
| 10 | −2224.2981 | DD[10] | | |
| 11 (St) | ∞ | 1.000 | | |
| *12 | 30.8848 | 3.200 | 1.72777 | 40.33 |
| *13 | 120.0291 | 6.525 | | |
| 14 | 47.8237 | 5.750 | 1.43387 | 95.20 |
| 15 | −25.9999 | 0.300 | | |
| 16 | 35.5584 | 1.000 | 1.84666 | 23.78 |
| 17 | 18.7906 | DD[17] | | |
| 18 | 28.2620 | 3.910 | 1.75700 | 47.82 |
| 19 | −39.3890 | 0.850 | 1.80100 | 34.97 |
| 20 | 116.4153 | DD[20] | | |
| 21 | ∞ | 3.471 | 1.92286 | 18.90 |
| 22 | −66.4719 | 1.000 | 1.69680 | 55.53 |
| 23 | 26.5775 | DD[23] | | |
| 24 | ∞ | 4.000 | 1.48749 | 70.23 |
| 25 | −63.0439 | 18.923 | | |
| 26 | ∞ | 0.590 | 1.54763 | 54.98 |
| 27 | ∞ | 0.810 | | |
| 28 | ∞ | 1.450 | 1.54763 | 54.98 |
| 29 | ∞ | 0.500 | | |
| 30 | ∞ | 0.700 | 1.49784 | 54.98 |
| 31 | ∞ | 1.126 | | |
| 32 (Sim) | ∞ | | | |

TABLE 11

| | Wide Angle End | Intermediate | Telephoto End |
|---|---|---|---|
| Zoom Ratio | 1.0 | 1.9 | 3.4 |
| f | 56.68 | 104.94 | 194.28 |
| F No. | 3.61 | 4.36 | 4.97 |
| 2ω (°) | 27.8 | 15.0 | 8.2 |
| DD[5] | 13.028 | 32.733 | 51.437 |
| DD[10] | 16.834 | 10.030 | 4.095 |
| DD[17] | 6.405 | 14.654 | 25.190 |
| DD[20] | 13.274 | 11.203 | 3.402 |
| DD[23] | 7.425 | 19.431 | 30.939 |

TABLE 12

| | Surface Number | |
|---|---|---|
| | 12 | 13 |
| KA | 1.0000000E+00 | 1.0000000E+00 |
| A3 | −1.6440506E−05 | −5.4776968E−06 |
| A4 | 5.0367616E−06 | 1.4797440E−05 |
| A5 | −3.9611750E−06 | −3.3004011E−07 |
| A6 | 4.3794978E−07 | −2.6623016E−07 |
| A7 | −1.7425799E−08 | 4.3347529E−08 |
| A8 | −1.1999814E−09 | −3.9578833E−10 |
| A9 | 9.6767610E−11 | −3.4714288E−10 |
| A10 | −5.6498891E−12 | 1.4083276E−11 |

Example 5

The lens configuration of the zoom lens of Example 5 is illustrated in FIG. 5. Table 13, Table 14, and Table 15 respectively show basic lens data, items and variable distances, and aspherical surface coefficients for the zoom lens of Example 5. FIGS. 12A through 12L are diagrams that illustrate the aberrations of the zoom lens of Example 5.

TABLE 13

| Si | Ri | Di | Ndj | vdj |
|---|---|---|---|---|
| 1 | 74.5663 | 4.323 | 1.48749 | 70.23 |
| 2 | 4455.0323 | 0.100 | | |
| 3 | 80.9477 | 1.710 | 1.62004 | 36.26 |
| 4 | 36.5894 | 6.226 | 1.48749 | 70.23 |
| 5 | 446.7710 | DD[5] | | |
| 6 | −232.4700 | 1.100 | 1.80400 | 46.58 |
| 7 | 50.8041 | 1.263 | | |
| 8 | −55.5719 | 0.850 | 1.83481 | 42.73 |
| 9 | 39.0797 | 2.100 | 1.92286 | 18.90 |
| 10 | 360.0866 | DD[10] | | |
| 11 (St) | ∞ | 1.000 | | |
| *12 | 120.8001 | 0.200 | 1.52409 | 53.79 |
| 13 | 55.7603 | 3.354 | 1.67270 | 32.10 |
| 14 | 242.6444 | 7.500 | | |
| 15 | 61.4302 | 4.500 | 1.49700 | 81.54 |
| 16 | −20.8247 | 0.300 | | |
| 17 | 70.5666 | 0.900 | 1.61293 | 37.00 |
| 18 | 19.8124 | DD[18] | | |
| 19 | 24.9885 | 4.510 | 1.74320 | 49.34 |
| 20 | −25.0000 | 0.850 | 1.80000 | 29.84 |
| 21 | 506.8185 | DD[21] | | |
| 22 | 121.2112 | 2.454 | 1.92286 | 20.88 |
| 23 | −39.7245 | 1.000 | 1.83400 | 37.16 |
| 24 | 20.4799 | DD[24] | | |
| 25 | −120.5002 | 4.000 | 1.48749 | 70.23 |
| 26 | −35.2921 | 21.551 | | |
| 27 | ∞ | 0.600 | 1.54763 | 54.98 |
| 28 | ∞ | 0.810 | | |
| 29 | ∞ | 1.550 | 1.54763 | 54.98 |
| 30 | ∞ | 0.500 | | |
| 31 | ∞ | 0.700 | 1.49784 | 54.98 |
| 32 | ∞ | 1.125 | | |
| 33 (Sim) | ∞ | | | |

TABLE 14

| | Wide Angle End | Intermediate | Telephoto End |
|---|---|---|---|
| Zoom Ratio | 1.0 | 2.0 | 4.0 |
| f | 51.53 | 102.53 | 204.00 |
| F No. | 4.12 | 6.15 | 6.14 |
| 2ω (°) | 30.4 | 15.8 | 8.0 |
| DD[5] | 10.613 | 24.568 | 53.036 |
| DD[10] | 17.000 | 11.624 | 3.993 |
| DD[18] | 5.990 | 10.114 | 17.029 |
| DD[21] | 13.933 | 9.561 | 3.303 |
| DD[24] | 7.429 | 44.402 | 47.667 |

TABLE 15

| | Surface Number |
|---|---|
| | 12 |
| KA | 1.0000000E+00 |
| A3 | −1.5977199E−05 |
| A4 | −2.5758548E−05 |
| A5 | −3.4997710E−06 |
| A6 | 4.0656428E−07 |
| A7 | −1.9671467E−08 |
| A8 | −2.1979498E−09 |
| A9 | 2.8442374E−11 |
| A10 | 5.5932197E−12 |
| A11 | 2.5280785E−12 |
| A12 | −2.4797637E−13 |

Example 6

The lens configuration of the zoom lens of Example 6 is illustrated in FIG. 6. Table 16, Table 17, and Table 18 respectively show basic lens data, items and variable distances, and aspherical surface coefficients for the zoom lens of Example 6. FIGS. 13A through 13L are diagrams that illustrate the aberrations of the zoom lens of Example 6.

TABLE 16

| Si | Ri | Di | Ndj | vdj |
|---|---|---|---|---|
| 1 | 91.2839 | 4.300 | 1.48749 | 70.23 |
| 2 | −750.7105 | 0.100 | | |
| 3 | 98.0341 | 1.610 | 1.60342 | 38.03 |
| 4 | 42.2950 | 6.100 | 1.48749 | 70.23 |
| 5 | 464.5310 | DD[5] | | |
| 6 | −127.1629 | 0.840 | 1.74950 | 35.33 |
| 7 | 60.0025 | 1.200 | | |
| 8 | −41.2999 | 0.850 | 1.78590 | 44.20 |
| 9 | 32.7880 | 1.900 | 1.92286 | 18.90 |
| 10 | 472.9846 | DD[10] | | |
| 11 (St) | ∞ | 1.000 | | |
| *12 | 35.2293 | 3.500 | 1.65296 | 36.79 |
| *13 | 207.5426 | 4.570 | | |
| 14 | 99.4961 | 4.500 | 1.49700 | 81.54 |
| 15 | −17.9929 | 0.300 | | |
| 16 | 51.7317 | 0.800 | 1.84666 | 23.78 |
| 17 | 20.6535 | DD[17] | | |
| 18 | 26.3323 | 2.000 | 1.59282 | 68.63 |
| 19 | 89.1617 | DD[19] | | |
| 20 | −128.4997 | 2.640 | 1.92286 | 20.88 |
| 21 | −52.1400 | 0.850 | 1.62299 | 58.16 |
| 22 | 26.0849 | DD[22] | | |
| 23 | −144.0763 | 4.000 | 1.61293 | 37.00 |
| 24 | −46.6261 | 17.840 | | |
| 25 | ∞ | 0.600 | 1.54763 | 54.98 |
| 26 | ∞ | 0.810 | | |
| 27 | ∞ | 0.350 | 1.54763 | 54.98 |
| 28 | ∞ | 0.600 | 1.54763 | 54.98 |
| 29 | ∞ | 0.600 | 1.54763 | 54.98 |
| 30 | ∞ | 0.500 | | |
| 31 | ∞ | 0.700 | 1.49784 | 54.98 |
| 32 | ∞ | 1.120 | | |
| 33 (Sim) | ∞ | | | |

TABLE 17

|  | Wide Angle End | Intermediate | Telephoto End |
|---|---|---|---|
| Zoom Ratio | 1.0 | 2.1 | 4.3 |
| f | 51.53 | 107.31 | 223.44 |
| F No. | 4.63 | 5.76 | 6.92 |
| 2ω (°) | 30.8 | 14.6 | 7.0 |
| DD[5] | 13.14 | 37.23 | 61.95 |
| DD[10] | 20.55 | 9.15 | 3.89 |
| DD[17] | 6.18 | 15.15 | 28.49 |
| DD[19] | 17.24 | 16.74 | 2.90 |
| DD[22] | 5.93 | 15.74 | 31.82 |

TABLE 18

| | Surface Number | |
|---|---|---|
| | 12 | 13 |
| KA | 1.0000000E+00 | 1.0000000E+00 |
| A3 | 0.0000000E+00 | 0.0000000E+00 |
| A4 | −2.1929710E−05 | 2.4812223E−05 |
| A5 | 0.0000000E+00 | 0.0000000E+00 |
| A6 | −2.6825828E−07 | −2.3807118E−07 |
| A7 | 0.0000000E+00 | 0.0000000E+00 |
| A8 | −1.4041431E−09 | 8.3060405E−10 |
| A9 | 0.0000000E+00 | 0.0000000E+00 |
| A10 | −1.3101658E−11 | −4.3238076E−11 |
| A11 | 0.0000000E+00 | 0.0000000E+00 |
| A12 | 2.0009875E−14 | 2.5906063E−13 |

Table 19 shows values corresponding to Conditional Formulae (1) and (2) for the zoom lenses of Examples 1 through 6.

TABLE 19

| Formula | | Example 1 | Example 2 | Example 3 | Example 4 | Example 5 | Example 6 |
|---|---|---|---|---|---|---|---|
| (1) | f1/f2 | −4.292 | −4.338 | −4.320 | −4.415 | −3.725 | −4.250 |
| (2) | d1w/f1 | 0.134 | 0.129 | 0.122 | 0.118 | 0.100 | 0.110 |

Figure 14A:
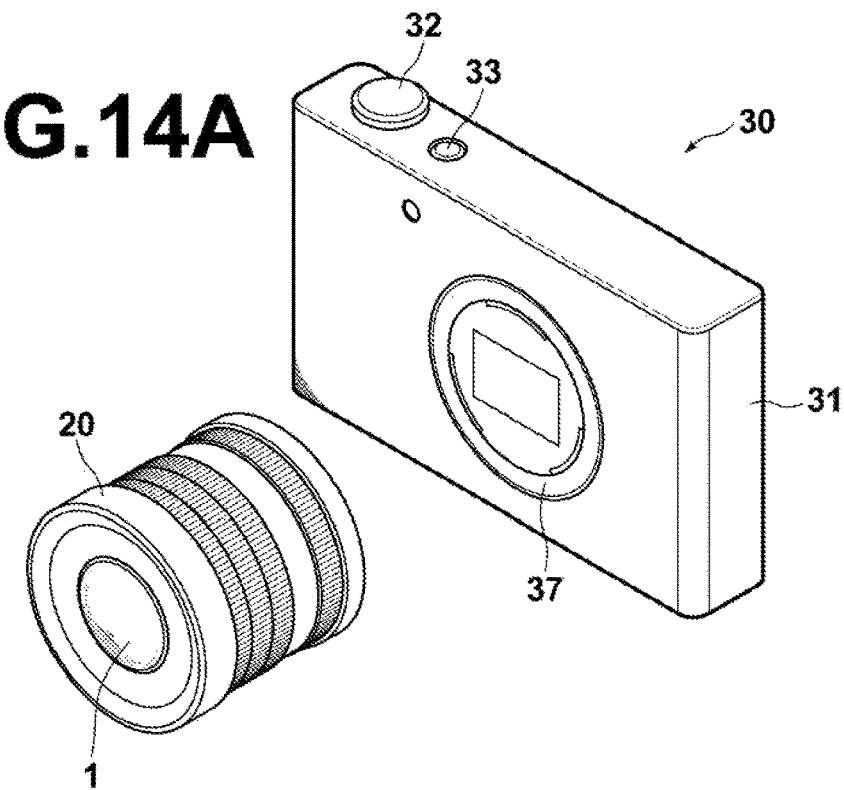
FIG. 14A is a perspective view that illustrates the front side of an imaging apparatus according to another embodiment of the present disclosure.
Figure 14B:
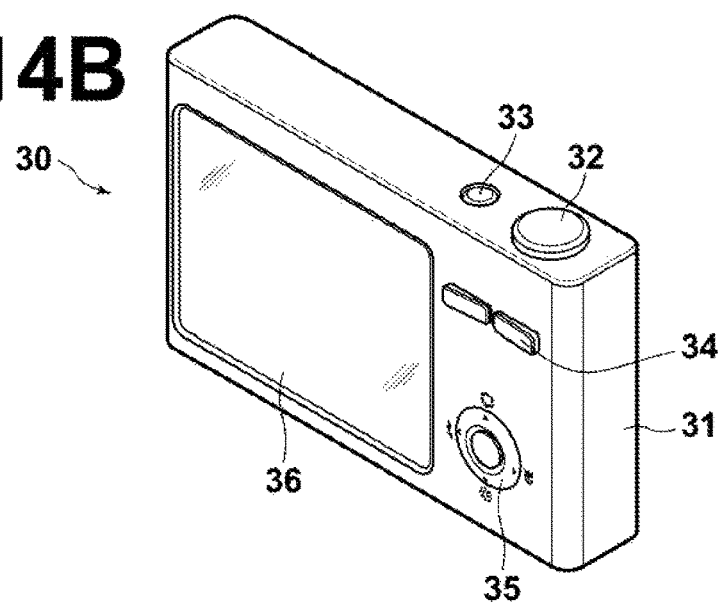
FIG. 14B is a perspective view that illustrates the rear side of an imaging apparatus according to the other embodiment of the present disclosure.

As can be understood from the data above, the zoom lenses of Examples 1 through 6 have focal lengths at the telephoto end within a range from 190 to 225, have short total lengths at the wide angle end and short total lengths at the telephoto end, and have high performance by correcting various aberrations Next, an imaging apparatus according to an embodiment of the present disclosure will be described with reference to FIG. 14A and FIG. 14B. A camera 30 of which perspective views are illustrated in FIG. 14A and FIG. 14B is an imaging apparatus according to an alternate embodiment of the present disclosure. The camera 30 is a non reflex type digital camera, which is configured such that an exchangeable lens 20, which is a zoom lens 1 according to an embodiment of the present disclosure housed in a lens barrel, can be interchangeably mounted thereon. FIG. 14A is a perspective view of the camera 30 as viewed from the front, and FIG. 14B is a perspective view of the camera 30 as viewed from the rear.

The camera 30 is equipped with a camera body 31. A shutter release button 32 and a power button 33 are provided on the upper surface of the camera body 31. Operating sections 34 and 35 and a display section 36 are provided on the rear surface of the camera body 31. The display section 36 displays images which have been photographed and images within the angle of view prior to photography.

A photography opening, in to which light from targets of photography enters, is provided at the central portion of the front surface of the camera body 31. A mount 37 is provided at a position corresponding to the photography opening. The exchangeable lens 20 is mounted onto the camera body 31 via the mount 37.

An imaging element (not shown), such as a CCD that outputs image signals corresponding to images of subjects formed by the exchangeable lens 20, a signal processing circuit that processes the image signals output by the imaging element to generate images, and a recording medium for recording the generated images, are provided within the camera body 31. In this camera 30, photography of a still image corresponding to a single frame or video imaging is enabled by pressing the shutter release button 32. Image data obtained by photography or video imaging are recorded in the recording medium.

The present disclosure has been described with reference to the embodiments and Examples thereof. However, the present disclosure is not limited to the embodiments and Examples described above, and various modifications are possible. For example, the values of the radii of curvature of each lens, the distances among surfaces, the refractive indices, the Abbe's numbers, the aspherical surface coefficients, etc., are not limited to the numerical values indicated in connection with the Examples, and may be other values.

In addition, a non reflex digital camera was described as the embodiment of the imaging apparatus. However, the imaging apparatus of the present disclosure is not limited to such cameras. The present disclosure may be applied to various other types of imaging apparatuses such as video cameras, digital cameras, cinematic cameras, and broadcast cameras as well.

What is claimed is:

1. A zoom lens consisting of six lens groups, which are, in order from the object side to the image side:
   a first lens group having a positive refractive power;
   a second lens group having a negative refractive power;
   a third lens group having a positive refractive power;
   a fourth lens group having a positive refractive power;
   a fifth lens group having a negative refractive power; and
   a sixth lens group having a positive refractive power;
   the distances between all pairs of adjacent lens groups changing when changing magnification from the wide angle end to the telephoto end;
   the distance between the third lens group and the fourth lens group being shortest at the wide angle end throughout the entire magnification range; and
   Conditional Formula (1) below being satisfied:

$$-5 < f1/f2 < -1.5 \quad (1)$$

wherein f1 is the focal length of the first lens group, and f2 is the focal length of the second lens group; and
   wherein the first lens group consists of, in order from the object side to the image side, a positive lens and a cemented lens formed by cementing a negative lens and a positive lens provided in this order from the object side to the image side together.

2. A zoom lens as defined in claim 1, wherein:
   the distance between the fourth lens group and the fifth lens group is shorter at the telephoto end than at the wide angle end.

3. A zoom lens as defined in claim 1, wherein:
the third lens group is positioned more toward the object side at the telephoto end than at the wide angle end.

4. A zoom lens as defined in claim 1, in which Conditional Formula (2) below is satisfied:

$$0.04 < d1w/f1 < 0.3 \quad (2)$$

wherein d1w is the distance along the optical axis between the first lens group and the second lens group at the wide angle end.

5. A zoom lens as defined in claim 1, wherein:
focusing operations are performed by moving the fourth lens group in the direction of the optical axis.

6. A zoom lens as defined in claim 1, wherein:
image blurs are corrected by moving the second lens group in a direction having a component perpendicular to the optical axis.

7. A zoom lens as defined in claim 1, wherein:
the third lens group has a negative meniscus lens with a concave surface toward the image side as the lens most toward the image side.

8. A zoom lens as defined in claim 1, wherein:
the fourth lens group consists of a cemented lens formed by cementing a biconvex lens and a biconcave lens together.

9. A zoom lens as defined in claim 1, wherein:
the fourth lens group consists of a single positive meniscus lens with a convex surface toward the object side.

10. A zoom lens as defined in claim 1, in which Conditional Formula (1-1) below is satisfied:

$$-4.8 < f1/f2 < -2.5 \quad (1\text{-}1).$$

11. A zoom lens as defined in claim 4, in which Conditional Formula (2-1) below is satisfied:

$$0.08 < d1w/f1 < 0.2 \quad (2\text{-}1).$$

12. A zoom lens as defined in claim 1, in which Conditional Formula (1-2) below is satisfied:

$$-4.6 < f1/f2 < -3.0 \quad (1\text{-}2).$$

13. A zoom lens as defined in claim 4, in which Conditional Formula (2-1) below is satisfied:

$$0.11 < d1w/f1 < 0.2 \quad (2\text{-}2).$$

14. A zoom lens as defined in claim 1, wherein:
the second lens group consists of, in order from the object side to the image side, a biconcave lens in which the absolute value of the radius of curvature of the surface toward the image side is less than the absolute value of the radius of curvature of the surface toward the object side and a cemented lens formed by cementing a biconcave lens and a positive meniscus lens with a convex surface toward the object side, provided in this order from the object side to the image side, together.

15. A zoom lens as defined in claim 1, wherein:
the second lens group consists of, in order from the object side to the image side, a cemented lens formed by cementing a biconcave lens in which the absolute value of the radius of curvature of the surface toward the image side is less than the absolute value of the radius of curvature of the surface toward the object side and a positive meniscus lens with a convex surface toward the object side, provided in this order from the object side to the image side, together, and a negative meniscus lens with a concave surface toward the object side.

16. An imaging apparatus comprising the imaging lens as defined in claim 1.

17. A zoom lens consisting of six lens groups, which are, in order from the object side to the image side:
a first lens group having a positive refractive power;
a second lens group having a negative refractive power;
a third lens group having a positive refractive power;
a fourth lens group having a positive refractive power;
a fifth lens group having a negative refractive power; and
a sixth lens group having a positive refractive power;
the distances between all pairs of adjacent lens groups changing when changing magnification from the wide angle end to the telephoto end;
the distance between the third lens group and the fourth lens group being shortest at the wide angle end throughout the entire magnification range; and
Conditional Formula (1) below being satisfied:

$$-5 < f1/f2 < -1.5 \quad (1)$$

wherein f1 is the focal length of the first lens group, and f2 is the focal length of the second lens group; and
wherein the third lens group has a negative meniscus lens with a concave surface toward the image side as the lens most toward the image side.

18. A zoom lens consisting of six lens groups, which are, in order from the object side to the image side:
a first lens group having a positive refractive power;
a second lens group having a negative refractive power;
a third lens group having a positive refractive power;
a fourth lens group having a positive refractive power;
a fifth lens group having a negative refractive power; and
a sixth lens group having a positive refractive power;
the distances between all pairs of adjacent lens groups changing when changing magnification from the wide angle end to the telephoto end;
the distance between the third lens group and the fourth lens group being shortest at the wide angle end throughout the entire magnification range; and
Conditional Formula (1) below being satisfied:

$$-5 < f1/f2 < -1.5 \quad (1)$$

wherein f1 is the focal length of the first lens group, and f2 is the focal length of the second lens group; and
wherein the fourth lens group consists of a single positive meniscus lens with a convex surface toward the object side.

* * * * *